(12) United States Patent
Suciu et al.

(10) Patent No.: US 10,180,117 B2
(45) Date of Patent: Jan. 15, 2019

(54) FULL RING SLIDING NACELLE WITH THRUST REVERSER

(71) Applicant: United Technologies Corporation, Farmington, CT (US)

(72) Inventors: Gabriel L. Suciu, Glastonbury, CT (US); Jesse M. Chandler, South Windsor, CT (US); T. David Bomzer, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 337 days.

(21) Appl. No.: 15/230,086

(22) Filed: Aug. 5, 2016

(65) Prior Publication Data

US 2016/0341149 A1 Nov. 24, 2016

Related U.S. Application Data

(63) Continuation of application No. 14/187,027, filed on Feb. 21, 2014, now Pat. No. 9,435,293.

(Continued)

(51) Int. Cl.
*F02C 3/04* (2006.01)
*F02K 1/62* (2006.01)
(Continued)

(52) U.S. Cl.
CPC .............. *F02K 1/605* (2013.01); *F01D 25/24* (2013.01); *F02C 3/04* (2013.01); *F02K 1/60* (2013.01); *F02K 1/62* (2013.01); *F02K 1/625* (2013.01); *F02K 1/64* (2013.01); *F02K 1/70* (2013.01); *F02K 1/72* (2013.01); *F02K 1/763* (2013.01); *F02K 1/766* (2013.01);
(Continued)

(58) Field of Classification Search
CPC ... F02K 1/60; F02K 1/605; F02K 1/62; F02K 1/625; F02K 1/64; F02K 1/70; F02K 1/72; F02K 1/763
See application file for complete search history.

(56) References Cited

U.S. PATENT DOCUMENTS 2,839,891 A * 6/1958 Drakeley .................. F02K 1/60
239/265.19
2,847,823 A * 8/1958 Brewer ................. B64C 23/005
239/265.29

(Continued)

FOREIGN PATENT DOCUMENTS

WO 2011014346 A2 2/2011

*Primary Examiner* — Scott J Walthour
(74) *Attorney, Agent, or Firm* — Kinney & Lange, P.A.

(57) ABSTRACT

A gas turbine engine includes a first annular portion that is stationary and adapted for partially surrounding an engine core. The first annular portion includes a fore pylon connecting portion. The gas turbine engine also includes a rail coupled to the fore pylon and extending in the aft direction from the first annular portion. The gas turbine engine also includes a second annular portion, arranged aft of the first portion and coupled to the rail. The second annular portion is movable along an engine core centerline between a closed position and at least one open position. The second annular portion is configured to engage the first annular portion in the closed position, thereby providing access to the engine core. The gas turbine engine further comprises a thrust reverser arranged in the second annular portion.

19 Claims, 22 Drawing Sheets

Related U.S. Application Data

(60) Provisional application No. 61/768,179, filed on Feb. 22, 2013, provisional application No. 61/768,176, filed on Feb. 22, 2013, provisional application No. 61/768,184, filed on Feb. 22, 2013, provisional application No. 61/770,719, filed on Feb. 28, 2013, provisional application No. 61/770,729, filed on Feb. 28, 2013, provisional application No. 61/770,735, filed on Feb. 28, 2013, provisional application No. 61/768,154, filed on Feb. 22, 2013, provisional application No. 61/768,160, filed on Feb. 22, 2013, provisional application No. 61/768,166, filed on Feb. 22, 2013, provisional application No. 61/768,171, filed on Feb. 22, 2013, provisional application No. 61/768,172, filed on Feb. 22, 2013.

(51) Int. Cl.
  *F02K 1/64* (2006.01)
  *F02K 1/70* (2006.01)
  *F02K 1/72* (2006.01)
  *F02K 1/76* (2006.01)
  *F01D 25/24* (2006.01)
  *F02K 1/60* (2006.01)

(52) U.S. Cl.
  CPC ...... *F05D 2220/32* (2013.01); *F05D 2230/72* (2013.01); *F05D 2240/14* (2013.01); *F05D 2270/051* (2013.01)

(56) References Cited

U.S. PATENT DOCUMENTS

| | | | |
|---|---|---|---|
| 2,943,443 A * | 7/1960 | Voymas | B64C 23/005 239/503 |
| 3,067,968 A | 12/1962 | Heppenstall | |
| 3,598,320 A * | 8/1971 | Babin | F02K 1/60 239/265.25 |
| 3,614,037 A | 10/1971 | Vdolek | |
| 3,690,561 A * | 9/1972 | Potter | F02K 1/563 239/265.29 |
| 3,856,239 A * | 12/1974 | Leibach | F02K 1/60 239/265.19 |
| 4,410,152 A | 10/1983 | Kennedy et al. | |
| 4,442,987 A | 4/1984 | Legrand et al. | |
| 4,485,970 A | 12/1984 | Fournier et al. | |
| 4,825,644 A | 5/1989 | Bubello et al. | |
| 4,960,243 A | 10/1990 | Dubois et al. | |
| 5,039,171 A | 8/1991 | Lore | |
| 5,110,069 A | 5/1992 | Webb | |
| 5,176,340 A * | 1/1993 | Lair | F02K 1/605 239/265.19 |
| 5,181,676 A * | 1/1993 | Lair | F02K 1/60 239/265.19 |
| 5,267,438 A | 12/1993 | Bunel et al. | |
| 5,372,006 A * | 12/1994 | Lair | F02K 1/06 239/265.19 |
| 5,497,961 A | 3/1996 | Newton | |
| 5,722,231 A | 3/1998 | Porte | |
| 5,863,014 A | 1/1999 | Standish | |
| 5,970,704 A | 10/1999 | Lardy et al. | |
| 6,079,201 A | 6/2000 | Jean | |
| 6,151,884 A | 11/2000 | Gonidec et al. | |
| 6,170,255 B1 | 1/2001 | Gonidec et al. | |
| 6,293,495 B1 | 9/2001 | Aten et al. | |
| 6,340,135 B1 | 1/2002 | Barton | |
| 6,786,038 B2 | 9/2004 | Lair | |
| 7,784,735 B2 | 8/2010 | Marche | |
| 7,959,107 B2 | 6/2011 | Beaufort | |
| 8,105,797 B2 | 1/2012 | Lalvani | |
| 8,226,027 B2 | 7/2012 | Journade et al. | |
| 9,435,293 B2 * | 9/2016 | Suciu | F02K 1/72 |
| 9,670,876 B2 * | 6/2017 | Chandler | F02K 1/62 |
| 9,695,778 B2 * | 7/2017 | Suciu | F02K 1/62 |
| 9,822,734 B2 * | 11/2017 | Chandler | F02K 1/62 |
| 9,970,388 B2 * | 5/2018 | Chandler | F02K 1/62 |
| 2003/0218094 A1 * | 11/2003 | Lair | B64D 33/04 244/110 B |
| 2005/0151012 A1 | 7/2005 | Lair | |
| 2008/0098720 A1 | 5/2008 | Watson | |
| 2009/0260344 A1 | 10/2009 | Hoyland | |
| 2010/0170984 A1 | 7/2010 | Journade et al. | |
| 2013/0219002 A1 | 8/2013 | Li et al. | |
| 2014/0239083 A1 | 8/2014 | Suciu et al. | |
| 2014/0239084 A1 | 8/2014 | Chandler et al. | |
| 2014/0360158 A1 * | 12/2014 | Gonidec | F02K 1/70 60/226.2 |
| 2015/0008268 A1 | 1/2015 | Suciu et al. | |
| 2015/0121839 A1 | 5/2015 | Chandler et al. | |
| 2015/0121895 A1 | 5/2015 | Suciu et al. | |
| 2015/0122912 A1 | 5/2015 | Suciu et al. | |
| 2015/0125270 A1 | 5/2015 | Suciu et al. | |
| 2015/0125284 A1 | 5/2015 | Suciu et al. | |
| 2015/0125285 A1 | 5/2015 | Suciu et al. | |
| 2015/0125286 A1 | 5/2015 | Suciu et al. | |

* cited by examiner

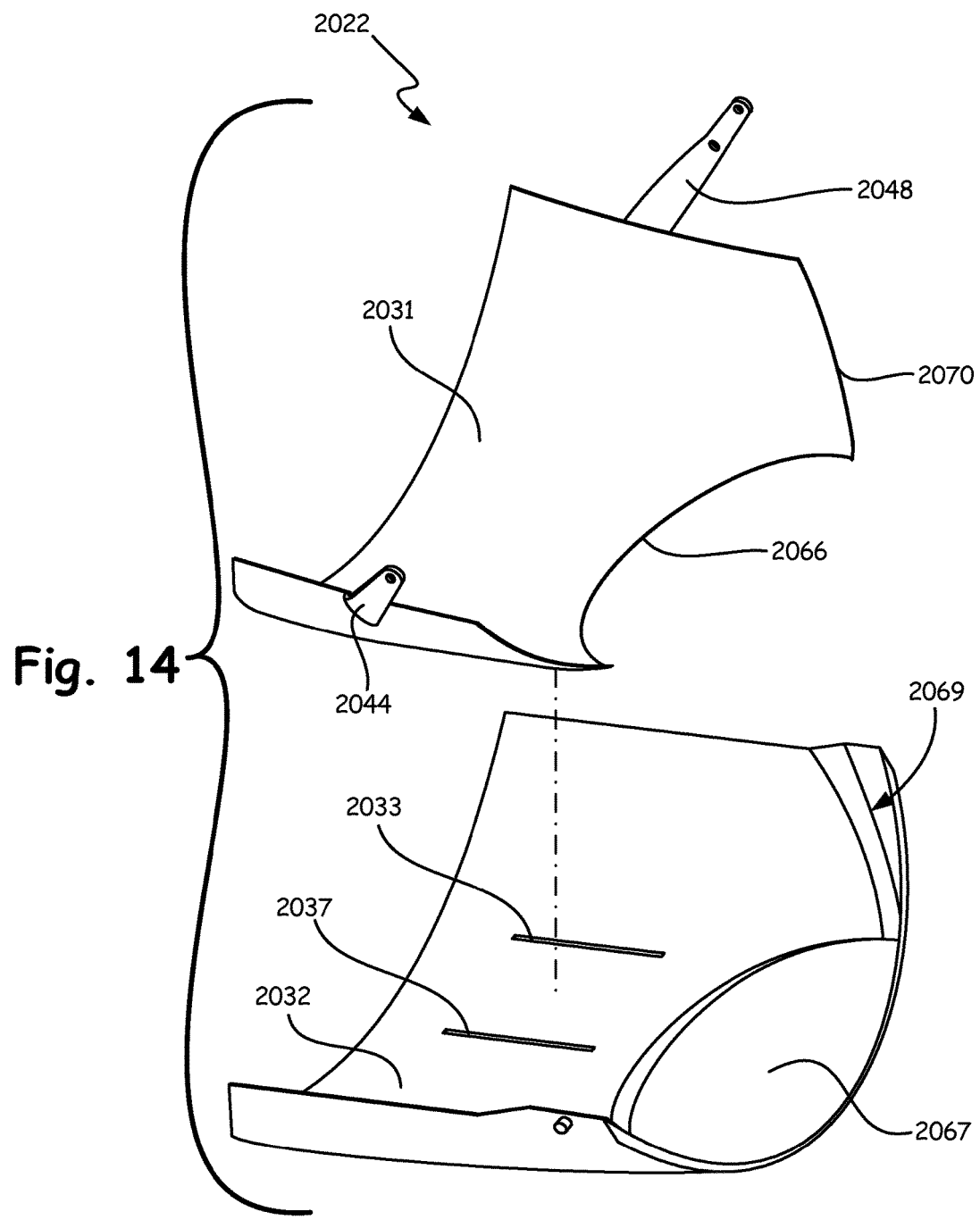

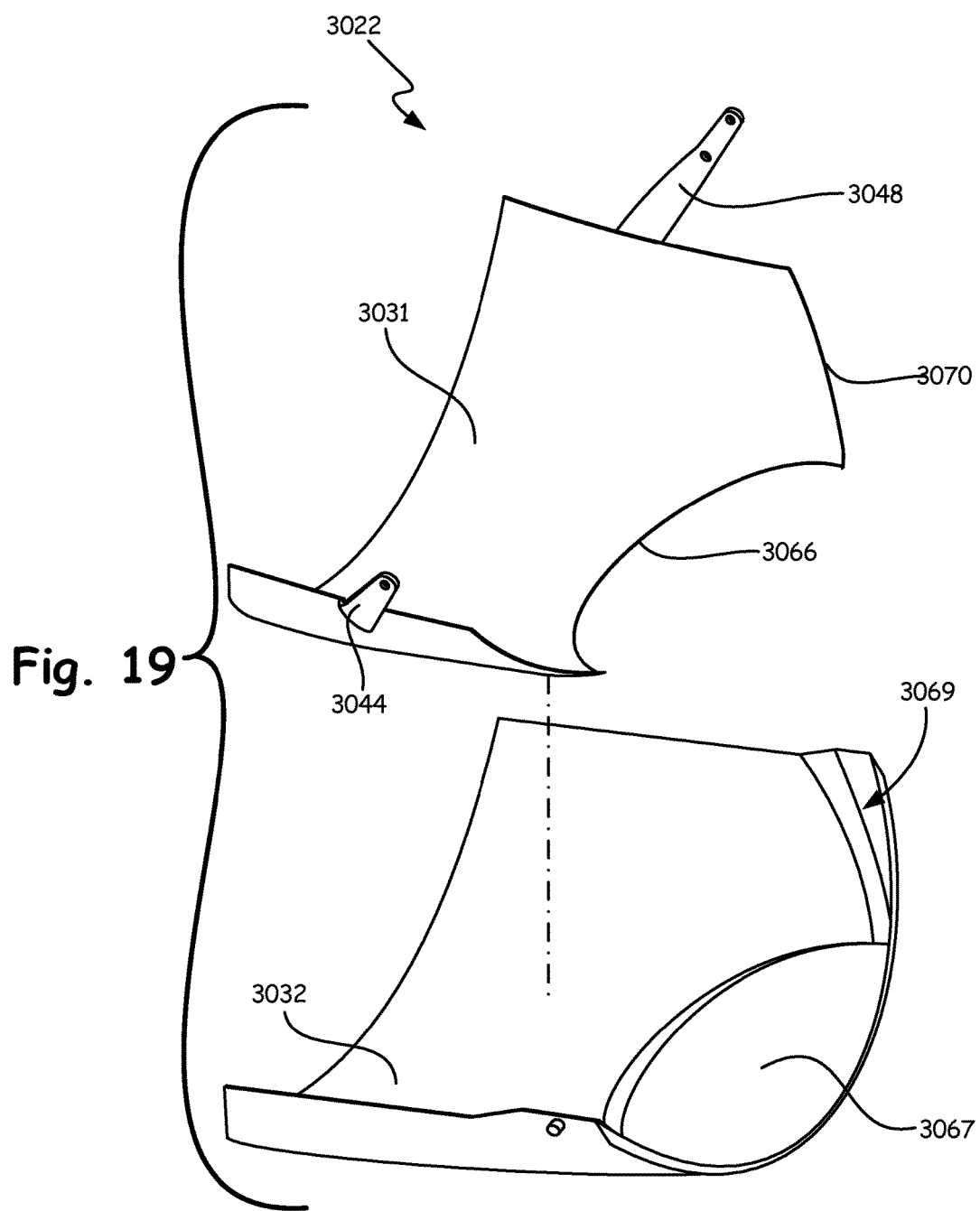

FULL RING SLIDING NACELLE WITH THRUST REVERSER

CROSS-REFERENCE TO RELATED APPLICATION(S)

This application is a continuation of U.S. application Ser. No. 14/187,027 filed Feb. 21, 2014 for "FULL RING SLIDING NACELLE WITH THRUST REVERSER" by Gabriel L. Suciu, Jesse M. Chandler, and T. David Bomzer.

This application also claims the benefit of U.S. Provisional Application No. 61/768,179, filed on Feb. 22, 2013, and entitled "ATR SLIDING NACELLE WITH THRUST REVERSER," the disclosure of which is incorporated by reference in its entirety.

This application also claims the benefit of U.S. Provisional Application No. 61/768,176, filed on Feb. 22, 2013, and entitled "ATR FULL RING SLIDING NACELLE," the disclosure of which is incorporated by reference in its entirety.

This application also claims the benefit of U.S. Provisional Application No. 61/768,184, filed on Feb. 22, 2013, and entitled "ATR INTEGRATED NOZZLE AND PLUG," the disclosure of which is incorporated by reference in its entirety.

This application also claims the benefit of U.S. Provisional Application No. 61/770,719, filed on Feb. 28, 2013, and entitled "ATR GUIDE PINS FOR SLIDING NACELLE," the disclosure of which is incorporated by reference in its entirety.

This application also claims the benefit of U.S. Provisional Application No. 61/770,729, filed on Feb. 28, 2013, and entitled "ATR AXIAL V-GROOVE," the disclosure of which is incorporated by reference in its entirety.

This application also claims the benefit of U.S. Provisional Application No. 61/770,735, filed on Feb. 28, 2013, and entitled "ATR PYLON FAIRING INTEGRATION," the disclosure of which is incorporated by reference in its entirety.

This application also claims the benefit of U.S. Provisional Patent Application No. 61/768,154, filed on Feb. 22, 2013, and entitled "ATR PIVOT THRUST REVERSER WITH CONTOURING AROUND CORE," the disclosure of which is incorporated by reference in its entirety.

This application also claims the benefit of U.S. Provisional Application No. 61/768,160, filed on Feb. 22, 2013, and entitled "ATR TANDEM THRUST REVERSER," the disclosure of which is incorporated by reference in its entirety.

This application also claims the benefit of U.S. Provisional Application No. 61/768,166, filed on Feb. 22, 2013, and entitled "ATR TANDEM THRUST REVERSER WITH 4-BAR LINKAGE," the disclosure of which is incorporated by reference in its entirety.

This application also claims the benefit of U.S. Provisional Application No. 61/768,171, filed Feb. 22, 2013 and entitled "ATR CONTOURED THRUST REVERSER WITH 3 POINT ACTUATION," the disclosure of which is incorporated by reference in its entirety.

This application also claims the benefit of U.S. Provisional Application No. 61/768,172, filed Feb. 22, 2013, and entitled "AIR TANDEM THRUST REVERSER WITH 3 POINT ACTUATION," the disclosure of which is incorporated by reference in its entirety.

BACKGROUND

Jet engines used in aerospace applications require periodic maintenance and repair. Typically, such jet engines are gas turbine engines surrounded by a nacelle. Part of the gas turbine engine surrounded by the nacelle is a core that includes fan, compressor, combustor, and turbine sections. A bypass duct passes through the gas turbine engine, and fan blades pass through the bypass duct. The core generates power that is used to propel an attached aircraft. The core is used to drive fan blades in the bypass duct to generate thrust, and core exhaust also creates thrust to propel the aircraft.

In order to facilitate maintenance and repair of the engine, known nacelles include doors that open outwards from the side of the nacelle, called "D-doors". When the engine needs repair or maintenance, the D-door is opened to provide access to engine parts. Some of the engine components that need regular maintenance or repair include the core and core externals. D-doors typically provide access to components of the core such as the combustor and turbine exhaust case that are not accessible from either the upstream or downstream ends of the gas turbine engine. Core externals include those devices that support the functions of the core, such as oil supply and drain, fuel supply, sensors, and wiring and connections to the sensors.

Externals pass through the bypass duct of the gas turbine engine. For example, fuel lines, oil supply and drain lines, and sensor leads must be connected to fuel tanks, oil supply systems, and controllers that are outside of the nacelle, respectively. Often, these externals are not suitable for routing through the bypass duct unprotected. Externals are often not structurally capable of supporting the loads that would be applied on them in the bypass duct. Furthermore, externals are often not aerodynamic, and routing through the bypass duct would result in undesirable drag on the bypass airstream. For this reason, externals are typically routed through a bifurcation, commonly referred to as a "bi-fi." A bi-fi is typically shaped as an airfoil having low to zero camber, and a chord direction parallel to the direction of the bypass airstream. The airfoil that makes up the bi-fi is hollowed out such that externals may be routed to the pylon or other sections of the aircraft without passing through the bypass airstream unprotected.

A common design of gas turbine engine has both an upper bi-fi and a lower bi-fi. The upper bi-fi shelters externals passing between the core and the pylon on which the engine is mounted. The lower bi-fi may be used for additional externals, or may be present to provide aerodynamic symmetry to the bypass duct.

D-doors are often arranged at or near the mid-point, axially, of the nacelle in which they are housed. D-doors often open upwards in the manner typically described as a "butterfly door." By opening the D-doors, a mechanic can gain access to the externals and/or core of the engine housed in the nacelle behind the D-door. Because the externals are housed not only within the nacelle (i.e., behind the D-door) but also within the bi-fi, known bi-fi designs are split such that they can also open in the "butterfly door" manner, or removed entirely. In other words, known bi-fi constructions include two identical halves, each half a mirror of the other side, which may be attached to one another to form a single airfoil surrounding the core externals of the gas turbine engine.

SUMMARY

A gas turbine engine includes a first annular portion that is stationary and adapted for partially surrounding an engine core. The first annular portion includes a fore pylon connecting portion. The gas turbine engine also includes a rail coupled to the fore pylon and extending in the aft direction from the first annular portion. The gas turbine engine also includes a second annular portion, arranged aft of the first portion and coupled to the rail. The second annular portion is movable along an engine core centerline between a closed position and at least one open position. The second annular portion is configured to engage the first annular portion in the closed position, thereby providing access to the engine core. The gas turbine engine further comprises a thrust reverser arranged in the second annular portion.

BRIEF DESCRIPTION OF THE DRAWINGS

FIG. 14 is an exploded perspective view of an inner panel and an outer panel of a tandem pivot door subassembly.

FIG. 19 is an exploded perspective view of an inner panel and outer panel of a tandem pivot door subassembly.

DETAILED DESCRIPTION

A nacelle has a slidable aft portion that can be slid away from a stationary fore portion along rails. The slidable aft portion allows access to the core externals, and, when the gas turbine engine is in a fully opened position, even allows for the core to be dropped out to undergo more extensive maintenance, repair, or replacement. The slidable portion can include a downstream portion of a bi-fi, so that core externals are accessible even when the slidable portion is in a partially-opened position. Various other improvements and configurations are described herein that facilitate enhanced access to the engine.

Figure 1A:
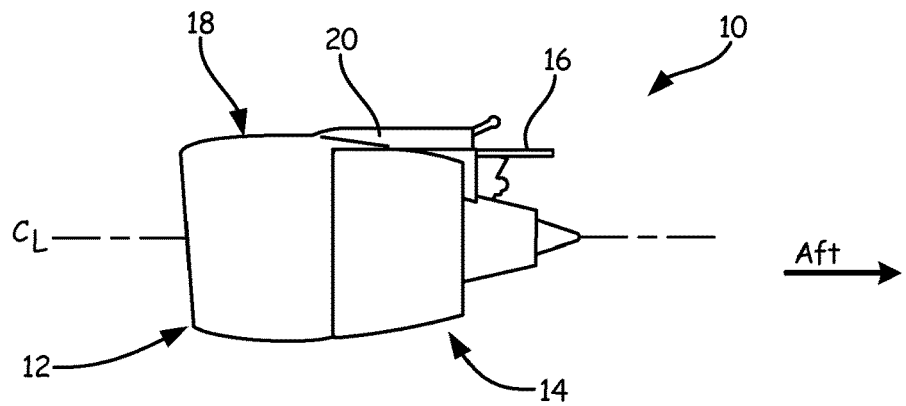
FIGS. 1A-1C are side views of a gas turbine engine with a slidable nacelle aft portion in closed, partially open, and fully open positions, respectively.
Figure 1B:
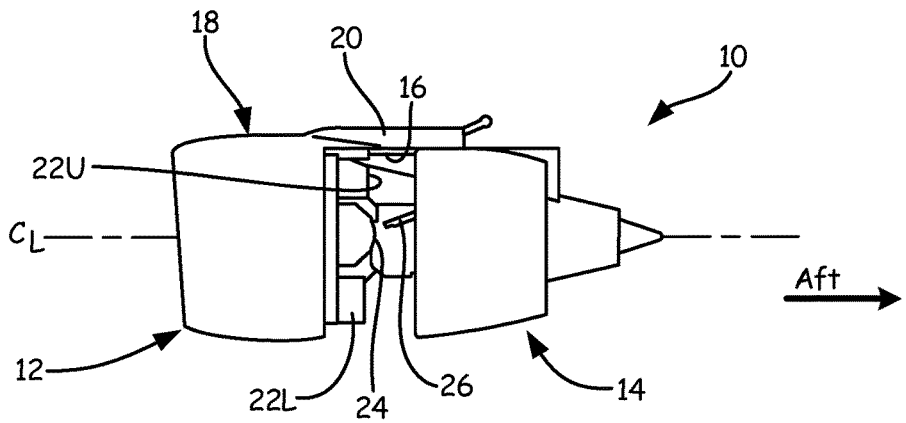
Figure 1C:
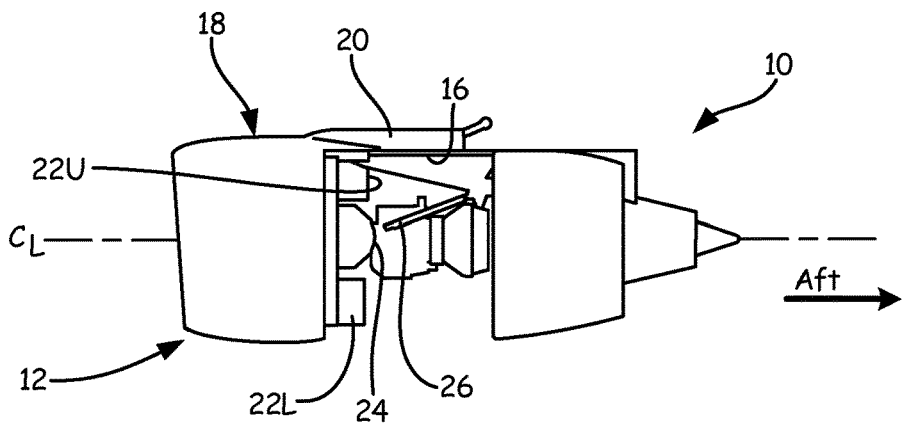

FIGS. 1A-1C illustrate gas turbine engine 10 in three potential positions. FIG. 1A illustrates gas turbine engine 10 in a fully closed position. This is the position gas turbine engine 10 would be in during operation. FIG. 1B illustrates gas turbine engine 10 in a partially open position. The partially open position may be sufficient for some repairs, modifications, or maintenance. FIG. 1C illustrates gas turbine engine 10 in a fully open position that may be helpful to carry out major repairs.

FIG. 1A is a side view of gas turbine engine 10. In FIG. 1A, the engine is in a fully closed or operational condition. Gas turbine engine 10 is made up of three primary components: stationary portion 12, slidable portion 14, and rail 16.

Stationary portion 12 includes fore nacelle 18, fore pylon 20, and engine core 24 (shown in FIGS. 1B and 1C). Fore nacelle 18 encloses various structures such as a fan, compressor sections, and/or bleed air systems that are well known in the art. In the embodiment shown in FIG. 1A, fore nacelle 18 is arranged about centerline $C_L$. Stationary portion 12 is attached to an aircraft (not shown) at fore pylon 20. Fore pylon 20 is a part of a larger pylori system that may include both stationary and movable components.

Slidable portion 14 is also centered about centerline $C_L$. Slidable portion 14 is mounted on rail 16, which extends parallel to centerline $C_L$. Rail 16 is stationary, in that it is fixed relative to stationary portion 12. Rail 16 may include a single track or multiple-track system. Slidable portion 14 is mounted to rail 16 such that slidable portion 14 may be moved fore and aft along rails 16. In some embodiments, rail 16 may be housed within part of a pylon system (not shown).

FIG. 1B is a side view of the gas turbine engine 10 shown in FIG. 1A. As shown in FIG. 1B, gas turbine engine 10 is in a partially open condition. Gas turbine engine 10 can be arranged in such partially open condition, starting from the closed position shown in FIG. 1A, by sliding slidable portion 14 along rail 16 in the aft direction. Gas turbine engine 10 includes the components previously described with respect to FIG. 1A. In addition, the view shown in FIG. 1B illustrates upper fore bi-fi 22U, lower fore bi-fi 22L, core 24, and externals 26.

Upper fore bi-fi 22U and lower fore bi-f 22L are fore portions of two bifurcations (commonly referred to as "bi-fi"s) that extend outward from core 24 to house externals 26. Upper fore bi-fi 22U and lower fore bi-fi 22L extend radially outward from centerline $C_L$ through a bypass duct (not shown). Upper fore bi-fi 22U and lower fore bi-fi 22L each form the leading edge of a larger bi-fi structure, described in more detail with respect to FIG. 2.

Core 24 is a portion of gas turbine engine 10 that is arranged along centerline $C_L$. Core 24, which typically includes combustor and turbine sections, generates power and thrust. Combustion of fuel and compressed air in core 24 can be used to do work on a core airstream (not shown), which can in turn be used to generate thrust or drive other components of gas turbine engine 10.

Externals 26 are used to support the functions of core 24. For example, externals include (but are not limited to) oil supply, oil sump, fuel supply, and sensors. Externals 26 are arranged such that they are circumferentially aligned with upper fore bi-fi 22U or lower fore bi-fi 22L. In this way, when gas turbine engine 10 is in a closed position, as described previously with respect to FIG. 1A, externals 26 are housed within a bi-fi structure as described with respect to FIG. 2 and protected from bypass airflow during engine operation.

A mechanic may desire to put gas turbine engine 10 into the partially-open position shown in FIG. 1B in order to service the engine. Often, for light maintenance or minor repairs, it is not necessary to remove (or "drop") the core. Instead, a mechanic may be able to diagnose, maintain, or make light repairs by gaining access to core 24 or externals 26, even though they are still mounted to an aircraft (not shown). By sliding slidable portion 14 along rail 16, some portions of core 24 and externals 26 are easily accessible. Furthermore, the configuration shown in FIG. 1B provides access from a wide variety of angles to core 24 and externals 26, free from obstructions and interference associated with hinged doors or access panels.

FIG. 1C shows gas turbine engine 10 of FIGS. 1A-1B in a "fully open" position. FIG. 1C illustrates the same components previously described with respect to FIG. 1B. In the engine configuration shown in FIG. 1C, slidable portion 14 has been moved so far aft that it is possible to access core 24 and externals 26 along their entire axial length. In fact, in the configuration shown in FIG. 1C, it is possible to drop core 24 out of engine 10. Dropping core 24 is often beneficial for significant maintenance or engine overhauls. In the configuration shown in FIG. 1C, it is possible to drop core 24 without having to deconstruct any blades, vanes, or other structures present in either stationary portion 12 or slidable portion 14.

In alternative embodiments, fore nacelle 18 need not be centered about centerline $C_L$. Various other externals 26 may be present or missing from alternative embodiments. Rail 16 may not extend linearly in the aft direction, but may be configured such that slidable portion 14 can be moved along core 24 in any direction to enhance access to core 24 and/or externals 26.

Figure 2:
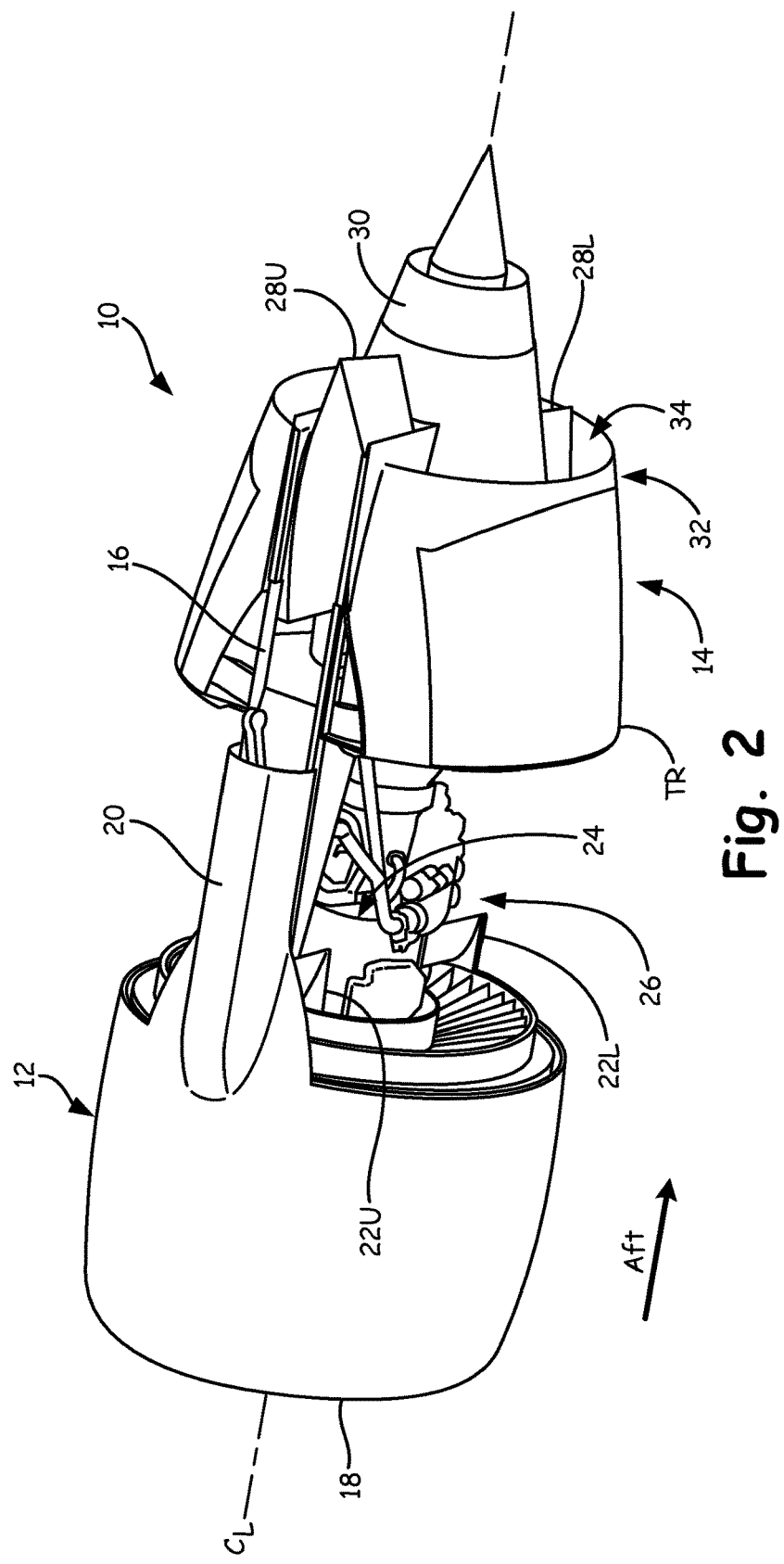
FIG. 2 is a perspective view of the gas turbine engine of FIGS. 1A-1C, illustrating the rail and bi-fi systems.

FIG. 2 is a perspective view of gas turbine engine 10, as previously described with respect to FIGS. 1A-1C. FIG. 2 shows gas turbine engine 10 with the slidable portion 14 moved aft from the closed position. FIG. 2 illustrates upper aft bi-fi 28U and lower aft bi-fi 28L, which are both a part of slidable portion 14. Further, FIG. 2 illustrates Inner Fixed Portion ("IFS") 30 and aft nacelle 32. IFS 30 is an annular structure that separates core 24 from bypass duct 34, which is defined by IFS 30 and aft nacelle 32. FIG. 2 further illustrates thrust reverser door TR. Thrust reverser door TR is part of a pivot thrust reverser system.

Rail 16 shown in FIG. 2 is a two-track system that is affixed to fore pylon 20. Slidable portion 14 is attached to rail 16 such that slidable portion 14 is movable along rail 16 along centerline $C_L$ in the aft direction.

Upper aft bi-fi 28U is configured such that, when gas turbine engine 10 is in the closed position previously described with respect to FIG. 1A, upper aft bi-fi 28U engages with upper fore bi-fi 22U to surround at least a portion of externals 26. Likewise, in the closed position lower aft bi-fi 28L engages with lower fore bi-fi 22L to surround at least a portion of externals 26. The structures formed by each pair of engaged bi-fis forms an airfoil that passes radially through bypass duct 34. Externals 26 are housed within the combined bi-fi structures to protect the externals and reduce aerodynamic drag that would be caused by exposed externals 26 within bypass duct 34.

Although rail 16 is shown as a two-track system in FIG. 2, various other configurations of rail 16 are possible. For example, in alternative embodiments, rail 16 may be a single track.

Figure 3A:
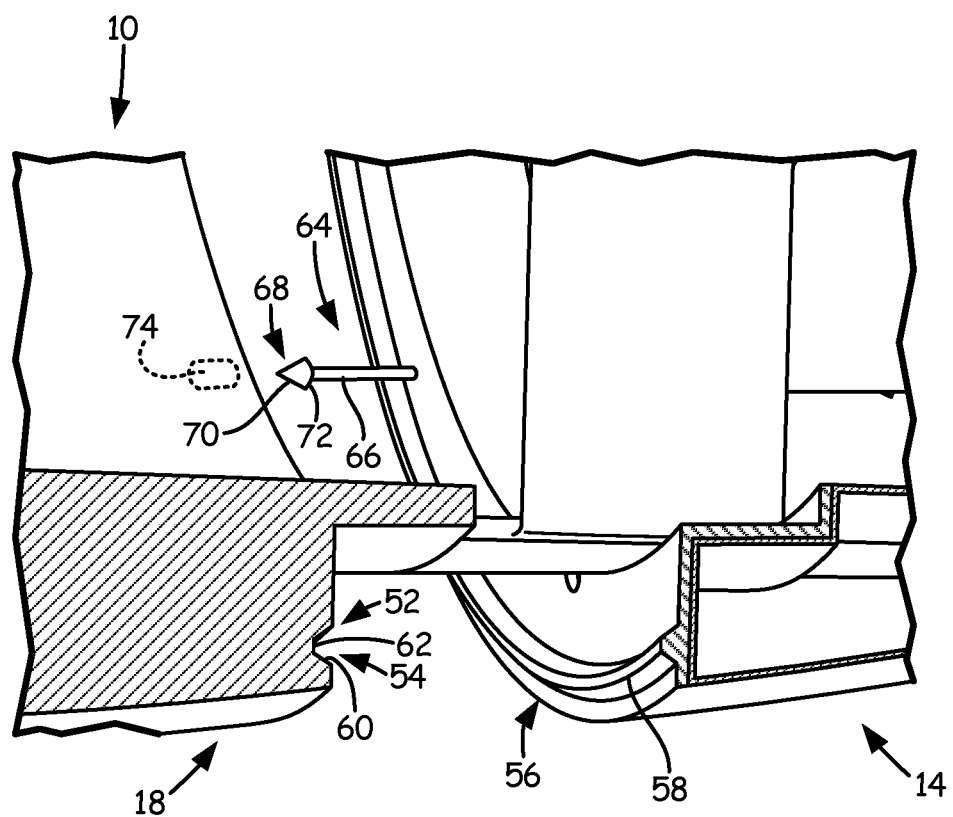
FIG. 3A is a perspective view, in section, of mating portions of the fore nacelle and slidable portions.

FIG. 3A is a perspective view, in section, of mating portions of fore nacelle 18 and slidable portion 14 in fully open position. Gas turbine engine 10, in addition to the components described in FIGS. 1A, 1B, 1C, and 2, includes axial groove 54, rib 58, guide pin 64 and locking mechanism 74. Fore nacelle 18 includes first inner radial surface 52, axial groove 54, and locking mechanism 74. Slidable portion 14 includes second inner radial surface 56, rib 38, and guide pin 64. Axial groove 54 includes side walls 60 and base wall 62. Axial groove 54 and rib 58 are configured to engage with each other when gas turbine engine 10 is in a closed position. Guide pin 64 includes pin shaft 66, and spearhead 68. Spearhead 68 includes front segment 70 and back segment 72.

Similar to the corresponding components of gas turbine engine 10, as described previously with respect to FIGS. 1A, 1B, 1C, and 2, slidable portion 14 can be in one of three positions, those being a fully closed, partially open, or fully open position. When partially or fully open, as depicted in FIG. 3A, first inner radial surface 52 on fore nacelle 18 is spaced apart from second inner radial surface 56 on slidable portion 14.

First inner radial surface 52 is an aft facing surface, and includes axial groove 54 and locking mechanism 74. Axial groove 54 extends axially inward (forward) from first inner radial surface 52 into fore nacelle 18. Axial groove 54 forms a continuous circle about the diameter of first inner radial surface 52. In alternative embodiments, axial groove 54 can form a discontinuous or fragmented circle about the diameter of first inner radial surface 52. Second inner radial surface 56 is a forward facing surface that, in the closed position, engages with first inner radial surface 52.

Locking mechanism 74 is disposed within first inner radial surface 52, spaced apart from guide pin 64 on second inner radial surface 56 in the partially open and fully open positions. Locking mechanism 74 extends into fore nacelle 18. Locking mechanism is configured to receive and engage guide pin 64.

Second inner radial surface 56 is configured to engage axial groove 54. Specifically, rib 58 is the portion of second inner radial surface 56 that engages axial groove 54. Rib 58 extends axially outward (forward) from second inner radial surface 56 and is spaced apart from axial groove 54 on first inner radial surface 52 in the partially open and fully open positions. Rib 58 can be machined along with slidable portion 14. Alternatively, rib 58 can be machined separately and mechanically fastened to slidable portion 14. The dimensions of rib 58 can be configured to substantially conform to and mate with the dimensions of axial groove 54. Rib 58 forms a continuous circle, commensurate with axial groove 54 about the diameter of second inner radial surface 56. In alternative embodiments, rib 58 can form a discontinuous circle about the diameter of second inner radial surface 56.

Second inner radial surface 56 also includes guide pin 64. Guide pin 64 extends axially outward (forward) from second inner radial surface 56. Guide pin 64 includes pin shaft 66 and spearhead 68. Pin shaft 66 is cylindrically shaped and can take on other shapes in different embodiments. Spearhead 68 includes front segment 70 and back segment 72. Front segment 70 is conically shaped, but can take on other shapes in different embodiments, and is tapered to point toward first inner radial surface 52. Back segment 72 is also conically shaped, and can take on different shapes in alternative embodiments, and is tapered to point toward second inner radial surface 56.

In operation, as described with respect to FIGS. 1A, 1B, 1C and 2 above, gas turbine engine 10 can be in fully or partially open position to expose engine core 24 or in a closed position during normal operation mode, (e.g., during flight). Gas turbine engine 10 moves from an open position to a closed position as described previously with respect to FIGS. 1A, 1B, 1C, and 2. As slidable portion 14 slides towards fore nacelle 18, rib 58 engages axial groove 54. Side walls 60, being nearly v-shaped, can help to guide rib 58 into axial groove 54. Base wall 62 provides a platform for rib 58 to engage axial groove 54. This can help improve the stability of the engagement between axial groove 54 and rib 58. Rib 58 and axial groove 54 form a radial engagement. That is, during normal operation mode (e.g., during flight), rib 58 and axial grove 54 are radially biased against each other. Rib 58 is configured to substantially conform to the dimensions of axial groove 54 thus providing a secure radial engagement between fore nacelle 18 and slidable portion 14. When axial groove 54 and rib 58 are fully engaged, first inner radial surface 52 and second inner radial surface 56 are in full contact with each other. In other embodiments of gas turbine engine 10 first inner radial surface 52 and second inner radial surface 56 may not be in full contact with one another when the engine is in the closed position around the full circumference of the engine. Although FIG. 3A shows, and the previous text describes, axial groove 54 as located on fore nacelle 18, one having ordinary skill in the art will appreciate that axial groove 54 could also be located on slidable portion 14 and rib 58 arranged on fore nacelle 18 without departing from the scope of the invention.

There are several advantages to using axial groove 54 and rib 58 to secure fore nacelle 18 and slidable portion 14 of gas turbine engine 10 including the following non-limiting examples. Because fore nacelle 18 and slidable portion 14 are radially engaged in the closed position, the two portions are less likely to be radially displaced during normal operation modes, (e.g., during flight). The engagement of axial groove 54 and rib 58 can also create a seal between fore nacelle 18 and slidable portion 14. The seal is advantageous because it can help to prevent bypass airflow from being lost at the intersection of the two portions, thus increasing the overall efficiency of gas turbine engine 10. Similarly, the seal can also prevent outside air from entering gas turbine engine 10 at the intersection of the two portions. A further advantage of the system is that axial groove 54 and rib 58 can help to position fore nacelle 18 and slidable portion 14 such that the outer surfaces of each portion are flush with each other. This can provide gas turbine engine 10 with a smooth and virtually continuous surface when in fully closed position. Accordingly, unnecessary drag and stress on gas turbine engine 10 can be reduced during flight.

Guide pin 64 engages locking mechanism 74 as rib 58 engages axial groove 54. Locking mechanism 74 can receive front segment 70 and back segment 72. Locking mechanism 74 then engages back segment 72 which places a back load on guide pin 64 and can help ensure proper engagement between fore nacelle 18 and slidable portion 14. Although locking mechanism 74 and guide pin 64 are shown as disposed on first inner radial surface 52 and second inner radial surface 56 respectively, one having ordinary skill in the art will recognize that locking mechanism 74 and guide pin 64 could be disposed on second inner radial surface 56 and first inner radial surface 52 respectively, without departing from the scope of this invention. Further, although fore nacelle 18 and slidable portion 14 are depicted as having a single locking mechanism 74 and a single guide pin 64, one having ordinary skill in the art will recognize that a plurality of locking mechanisms 74 and guide pins 64 can be included without departing from the scope of the invention.

Figure 3B:
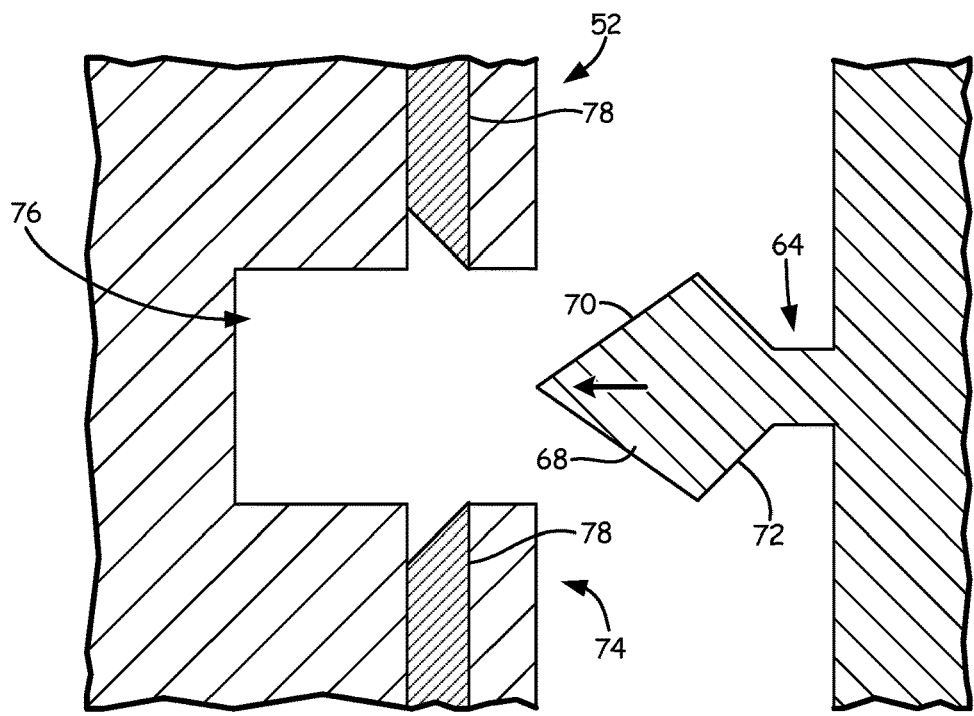
FIGS. 3B-3C are enlarged side views of the locking mechanism shown in FIG. 3A, in partially open and closed positions, respectively.

FIG. 3B is an enlarged side view of locking mechanism 74 and guide pin 64 as described above with respect to FIG. 3A. Locking mechanism 74 includes well 76 and collars 78. In FIG. 3B, gas turbine engine 10 is in a partially open position. Thus, guide pin 64 is axially spaced from well 76. Locking mechanism 74 is configured to be disposed within first inner radial surface 52 and receive guide pin 64 when gas turbine engine 10 is in the closed position. Prior to engaging guide pin 64, collars 78 are recessed within locking mechanism 74 which leaves well 76 open.

Figure 3C:
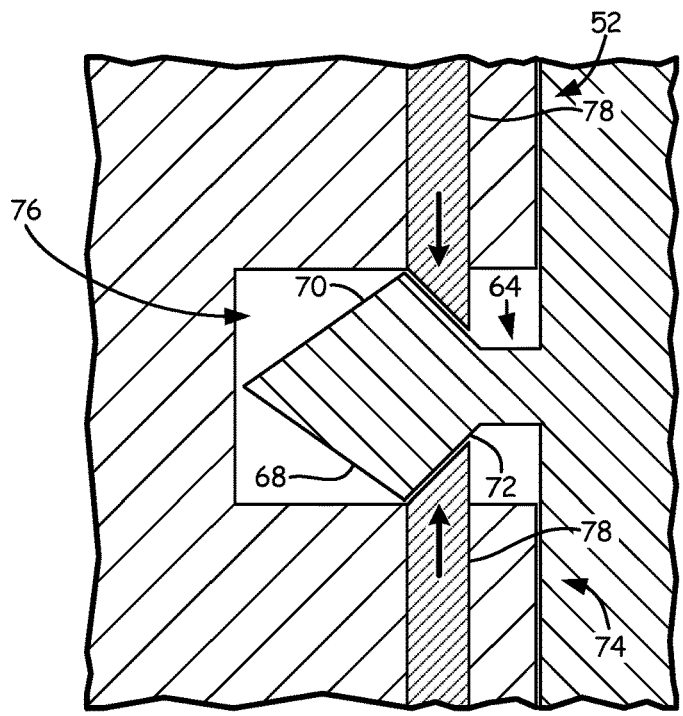

FIG. 3C shows the locking mechanism 74 of FIG. 3B with gas turbine engine 10 in the closed position. Slidable portion 14 (FIGS. 1A-1C, 2) is brought into mating engagement with fore nacelle 18, and spearhead 68 engages locking mechanism 74. As a result of its conical shape, front segment 70 is guided into well 76. When spearhead 68 is fully encompassed within well 76, collars 78 are deployed to engage back segment 72. Collars 78 are configured to engage back segment 72 by substantially matching the profile of back segment 72. In this way, collars 78 prevent axial displacement of guide pin 64. Collars 78 can be deployed using a suitable actuator (not shown).

There are several advantages to using guide pin 64 and locking mechanism 74 to secure fore nacelle 18 and slidable portion 14 including the following non limiting examples. When back segment 72 is engaged by collars 78 a back load is placed on guide pin 64 to ensure proper engagement of fore nacelle 18 and slidable portion 14 which can help reduce the risk of the two portions separating during flight. Additionally, guide pin 64 and locking mechanism 74 can help to facilitate proper alignment of axial groove 54 and rib 58 as well as secure the connection between them. A further advantage is that guide pin 64 and locking mechanism 74 can help to position fore nacelle 18 and slidable portion 14 such that the outer surfaces of each portion are flush with each other. This can provide gas turbine engine 10 with a smooth and virtually continuous surface when in fully closed position. Accordingly, unnecessary drag and stress on gas turbine engine 10 can be reduced during flight.

Figure 4A:
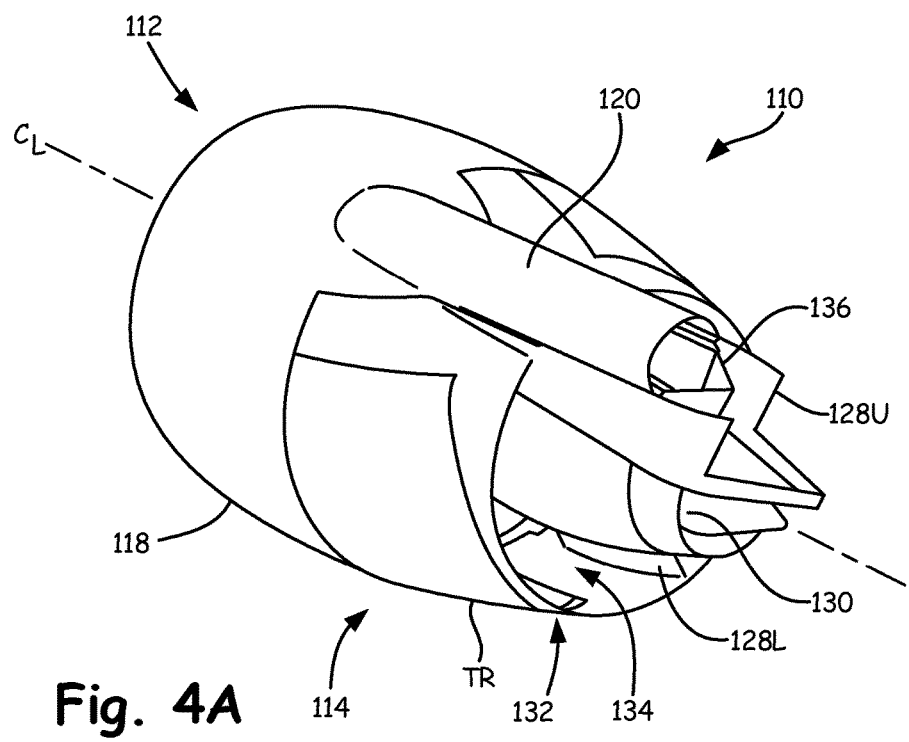
FIG. 4A is a perspective view of a gas turbine engine in a closed configuration, the engine having a slidable nacelle aft portion that includes an aft pylori.
Figure 4B:
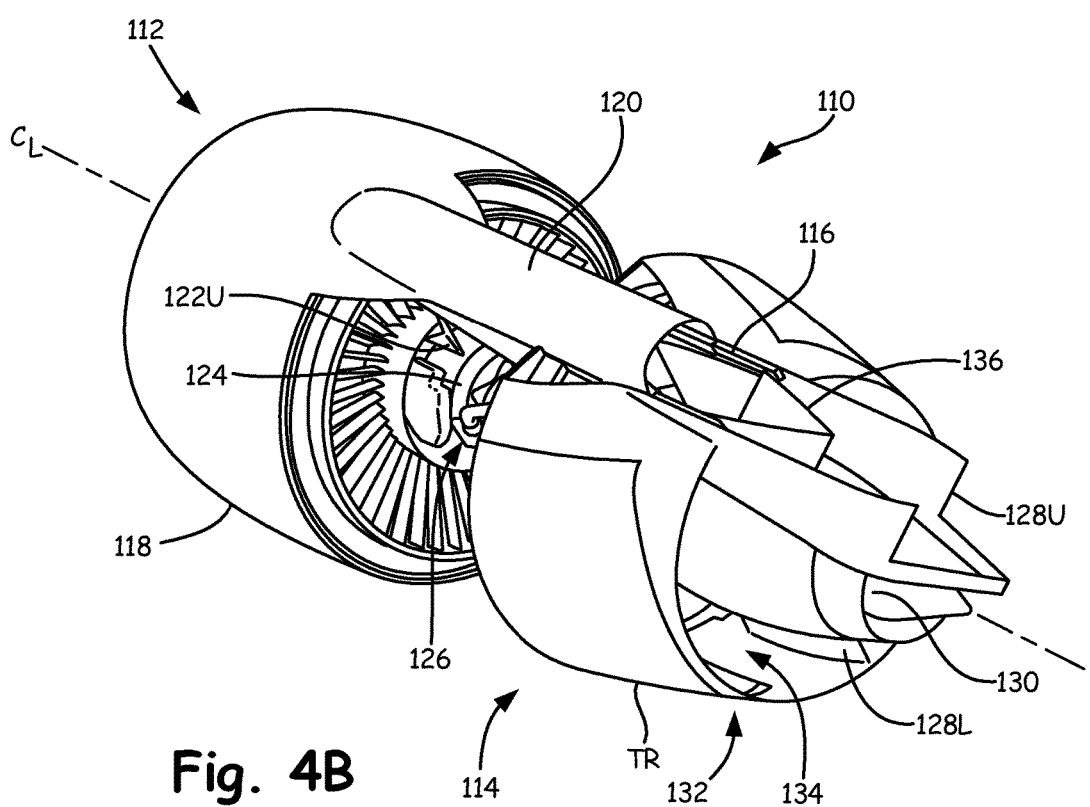
FIG. 4B is a perspective view of the gas turbine engine of FIG. 4A in an open configuration.

FIGS. 4A-4B show gas turbine engine 110, which includes stationary portion 112, slidable portion 114, and rail 116. FIG. 4A shows gas turbine engine 110 in the closed position. Gas turbine engine 110 is similar to gas turbine engine 10 of FIGS. 1A-1C and 2. However, gas turbine engine 110 also includes aft pylori 136, which was not present in gas turbine engine 10. Aft pylon 136 is slidable to provide access to additional components within gas turbine engine 110. FIGS. 4A-4B further include thrust reverser door TR, as previously described with respect to FIG. 2. Thrust reverser door TR is a part of a pivot thrust reverser system.

The components that make up gas turbine engine 110 are substantially similar to the components previously described with respect to gas turbine engine 10 of FIGS. 1A-1C and FIG. 2. Stationary portion 112 includes fore nacelle 118, fore pylon 120, upper fore bi-fi 122U, lower fore bi-fi (not shown in this perspective), core 124, and externals 126. Slidable portion 114 includes upper aft bi-fi 128U, lower aft bi-fi 128L, IFS 130, and aft nacelle 132. IFS 130 and aft nacelle 132 define bypass duct 134.

In addition to those components already described in detail previously, gas turbine engine 110 includes aft pylori 136. Aft pylon 136 is a part of slidable portion 114—that is, aft pylori travels along rail 116 when gas turbine engine 110 is rearranged between open, partially open, and closed positions. In the embodiment shown in FIG. 4A, aft pylori 136 is connected to aft nacelle 132, such that translation of aft nacelle 132 along rail 116 causes an equal movement of aft pylori 136. Because slidable portion 114 is fully forward (that is, gas turbine engine 110 is in a closed configuration), aft pylori 136 engages with fore pylon 120. When engaged, fore pylon 120 and aft pylori 136 cooperate to house various structures such as supply lines, cables, and/or structural supports from any surrounding airstream. Fore pylon 120 and aft pylori 136 may simply have complementary shapes to fit together, or may be fastened to one another with a variety of known fastening mechanisms (not shown).

Aft pylon 136 cooperates with fore pylon 120 to house various components that pass between gas turbine engine 110 and a related aircraft (not shown). Such components may include structural supports to affix gas turbine engine 110 to an aircraft wing, or fuel, oil, and/or electronics conduits or passages between gas turbine engine 110 and various remote systems, none of which are shown in FIG. 4A. In the event that these various components need maintenance, replacement, or attention of any other variety from a mechanic, placing gas turbine engine 110 in a partially open or open state facilitates access to those components.

Furthermore, aft pylori 136 increases the structural integrity of slidable portion 114. Aft pylon 136 binds together those portions of aft nacelle 132 that are attached to rail 116. This reduces the potential for aft nacelle 132 to exert stresses on rail 116, and prevents distension of aft nacelle 132.

FIG. 4B shows gas turbine engine 110 of FIG. 4A in an open position. As previously described with respect to FIG. 4A, aft pylori 136 is slidable to provide access to additional components within gas turbine engine 110. As shown in FIG. 4B, gas turbine engine 110 is at least partially open, such that aft pylori 136 is separated from fore pylon 120. Thus, a mechanic is able to inspect, repair, or replace components that were surrounded by the engaged structure shown with respect to FIG. 4A.

In alternative embodiments, aft pylori 136 may be configured to move along rail 116 independently of aft nacelle 132. In further alternative embodiments, aft pylori 136 need not be configured to travel along rail 116 at all, but may instead be detachable from fore pylon 120 when aft nacelle 132 is not in the closed position.

Figure 5A:
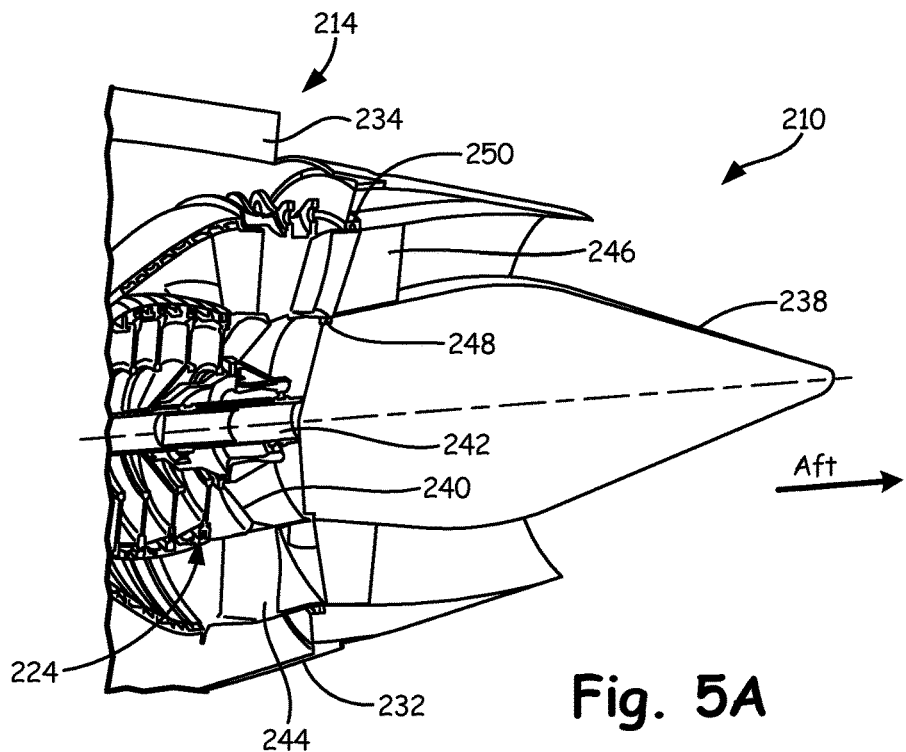
FIG. 5A is a perspective view of a nozzle plug connected to a slidable portion and engaged with a turbine.
Figure 5B:
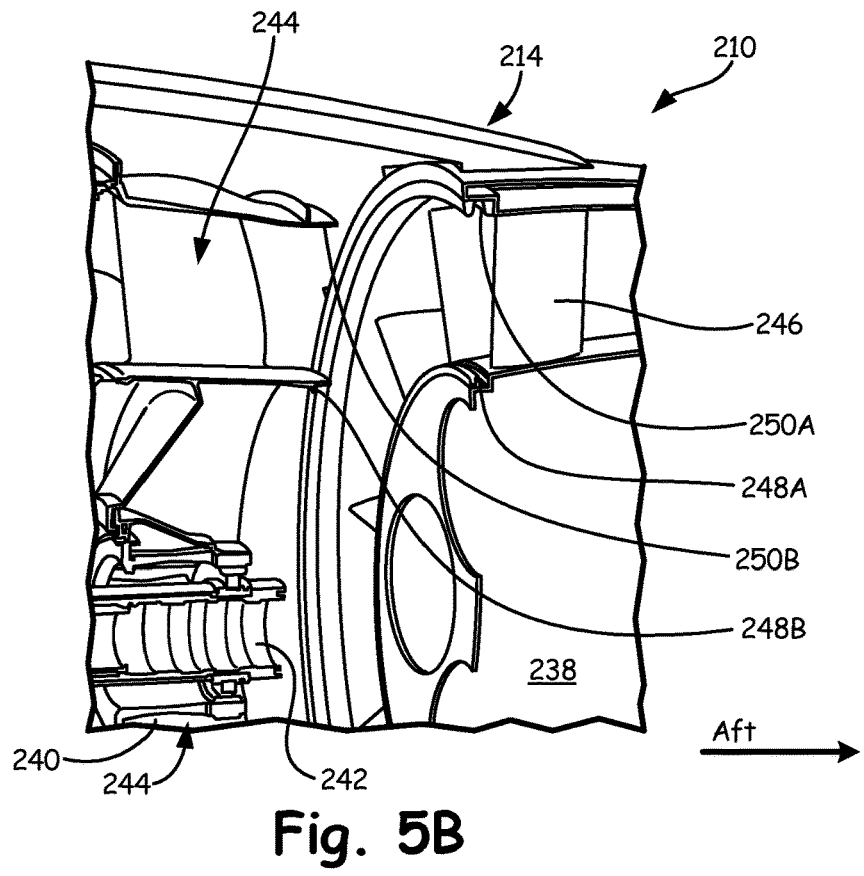
FIG. 5B is a perspective view of the nozzle plug, slidable portion, and turbine exhaust case of FIG. 5A, with the slidable portion and nozzle plug disengaged from the turbine.

FIGS. 5A-5B illustrate the aftmost portion of gas turbine engine 210. In particular, FIGS. 5A-5B show a nozzle plug that is configured to complement the slidable portions of gas turbine engines previously described with respect to FIGS. 1A-1C, 2, and 4A-4B. Nozzle plugs are used in gas turbine engines to route exhaust gases through the turbine exhaust case. Nozzle plug geometry can affect aerodynamic performance and engine acoustics. It is desirable to have the nozzle plug be movable with the slidable portion, so that a wide variety of nozzle plug geometries can be used without risking interference between the slidable portion and the nozzle plug that may have occurred if the nozzle plug remained affixed to the engine core.

FIG. 5A is a perspective view of gas turbine engine 210 in the closed position. Gas turbine engine 210 includes many similar components to gas turbine 10 and gas turbine engine 110 previously described. In particular, gas turbine engine 210 includes core 224, aft nacelle 232, bypass duct 234, nozzle plug 238, turbine 240, shaft 242, turbine exhaust case 244, and strut 246. Furthermore, gas turbine engine 210 includes inner seal 248 and outer seal 250.

Core 224 is circumscribed by aft nacelle 232, which is slidable in the aft direction. Bypass duct 234 is a plenum through which a bypass airstream can flow. Nozzle plug 238 is arranged aft of turbine 240. Turbine 240 rotates about shaft 242, and turbine exhaust case 244 provides egress for exhaust gases from turbine 240. Strut 246 passes through turbine exhaust case 244.

Aft nacelle 232 is slidable in the fore and aft directions. Core 224 engages with nozzle plug 238. Core 224 includes turbine section 240 and shaft 242. Core 224 can exhaust air radially outward of nozzle plug 238 from centerline $C_L$ through turbine exhaust case (TEC) 244. TEC 244 is a passage from turbine section 240 in the aft direction, supported by struts 246. Bypass air is routed through bypass duct 234, which is located radially further outward from turbine exhaust case 244.

Nozzle plug 238 engages with core 224 at inner seal 248. Likewise, TEC 244, which is fixed to core 224, engages with the slidable portion 214 at outer seal 250. As shown in FIG. 5A, inner seal 248 and outer seal 250 are both W-shaped seals. Thus, an airstream passing through turbine 240 is not able to pass through inner seal 248 to nozzle plug 238 or turbine exhaust case 244. Likewise, an airstream is not able to escape TEC 244 through either of inner seal 248 nor outer seal 250.

Core 224 is often left in place while slidable portion 214 is moved in the aft direction, as previously described with respect to earlier figures, in order to facilitate maintenance, inspection, or repair of gas turbine engine 210. Nozzle plug 238 is shaped to accomplish various objectives, such as to maximize efficiency of gas turbine engine 210 or reduce exhaust noise during engine operation. Often, as shown in FIG. 5A, nozzle plug 238 must be movable with slidable portion 214 or else it will impinge movement of slidable portion 214 in the aft direction.

Inner seal 248 and outer seal 250 enable nozzle plug 238 to be sealed to core 224 during operation, but removed during partially open or open conditions (i.e., when slidable portion 214 is moved in the aft direction from the position shown in FIG. 4A).

In FIG. 5B, gas turbine engine 210 is in a partially open condition. Nozzle plug 238 is a part of slidable portion 214, and thus nozzle plug 238 is axially spaced aft from core 224. This arrangement illustrates the functions of inner seal 248 and outer seal 250 of FIG. 5A.

Inner seal 248 includes inner seal outer portion 248A on nozzle plug 238 and inner seal inner portion 248B on TEC 244. When gas turbine engine 210 is in the closed position, as previously described with respect to FIG. 5A, inner seal outer portion 248A and inner seal inner portion 248B engage to prevent ingress or egress of air at inner seal 248. Likewise, outer seal outer portion 250A on TEC 244 and outer seal inner portion 250B on slidable portion 214 engage to prevent ingress or egress of air at outer seal 250 of FIG. 5A.

During repair, maintenance, and/or inspection, it is not necessary to maintain an airtight seal between inner seal outer portion 248A and inner seal inner portion 248B, nor between outer seal outer portion 250A and outer seal inner portion 250B. Furthermore, in some embodiments separation of nozzle plug 238 from core 224 with slidable portion 214 is beneficial. The structures described above provide for a movable nozzle plug that nonetheless prevents air leakage between the plena separated by inner seal 248 and the plena separated by outer seal 250.

Generally, a pivot thrust reverser can be deployed to surround (or, synonymously, contour around) a portion of a gas turbine engine inner bypass duct wall such that a fan bypass stream is interrupted and reversed with relatively little leakage, while a core stream and a nacelle ventilation stream are unobstructed or substantially unobstructed. When stowed, thrust reverser pivot doors can make up a portion of both a surface of a bypass duct (e.g., an outer duct wall) and an outer surface of a nacelle. The pivot doors can be pivotally deployed from a stowed position to a deployed position by a single actuator on pivot axes that are positionally fixed relative to the gas turbine engine.

Figure 6A:
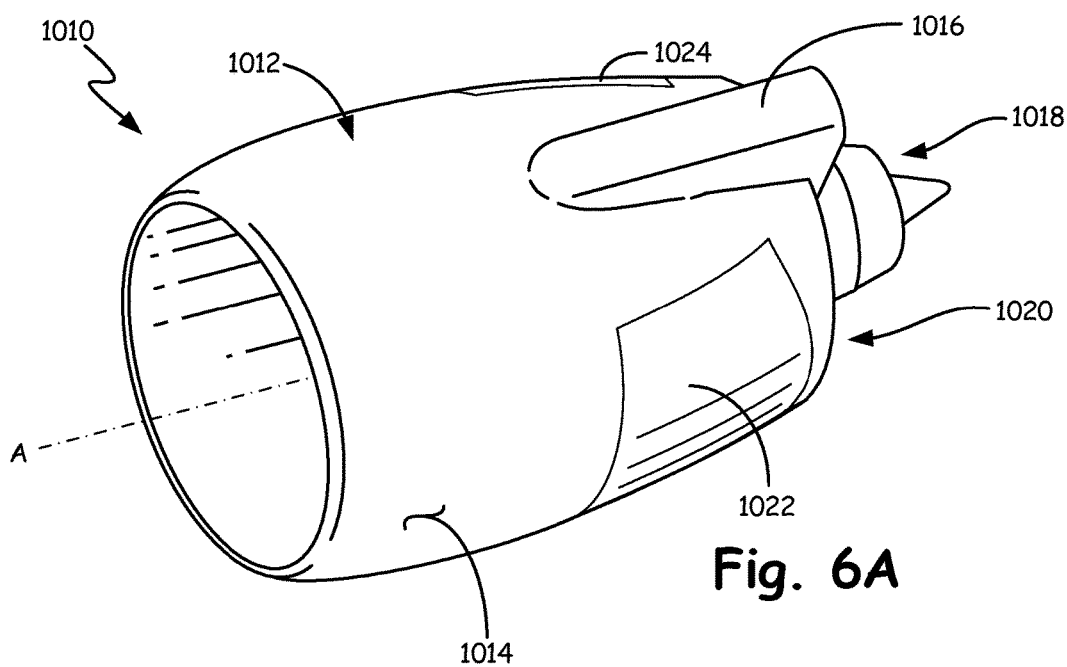
FIG. 6A is a perspective view of an embodiment of a gas turbine engine and nacelle assembly with a thrust reverser according to the present invention, shown in a stowed position.
Figure 6B:
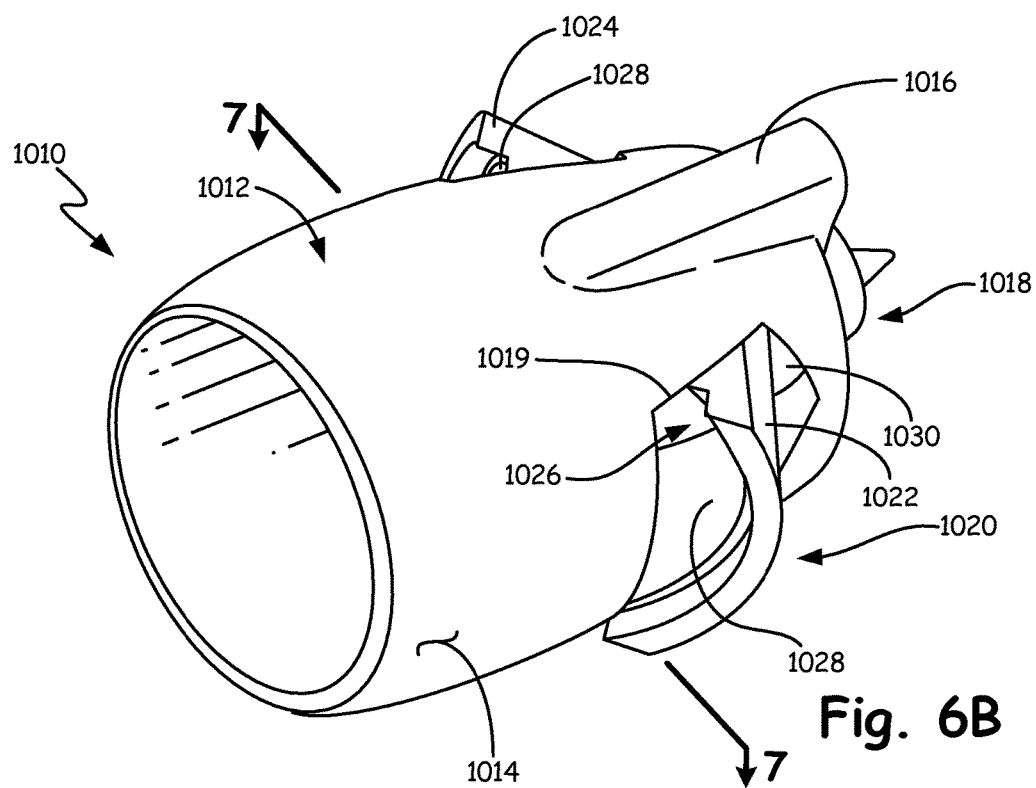
FIG. 6B is a perspective view of the gas turbine engine and nacelle assembly of FIG. 6A with the thrust reverser shown in a deployed position.
Figure 7:
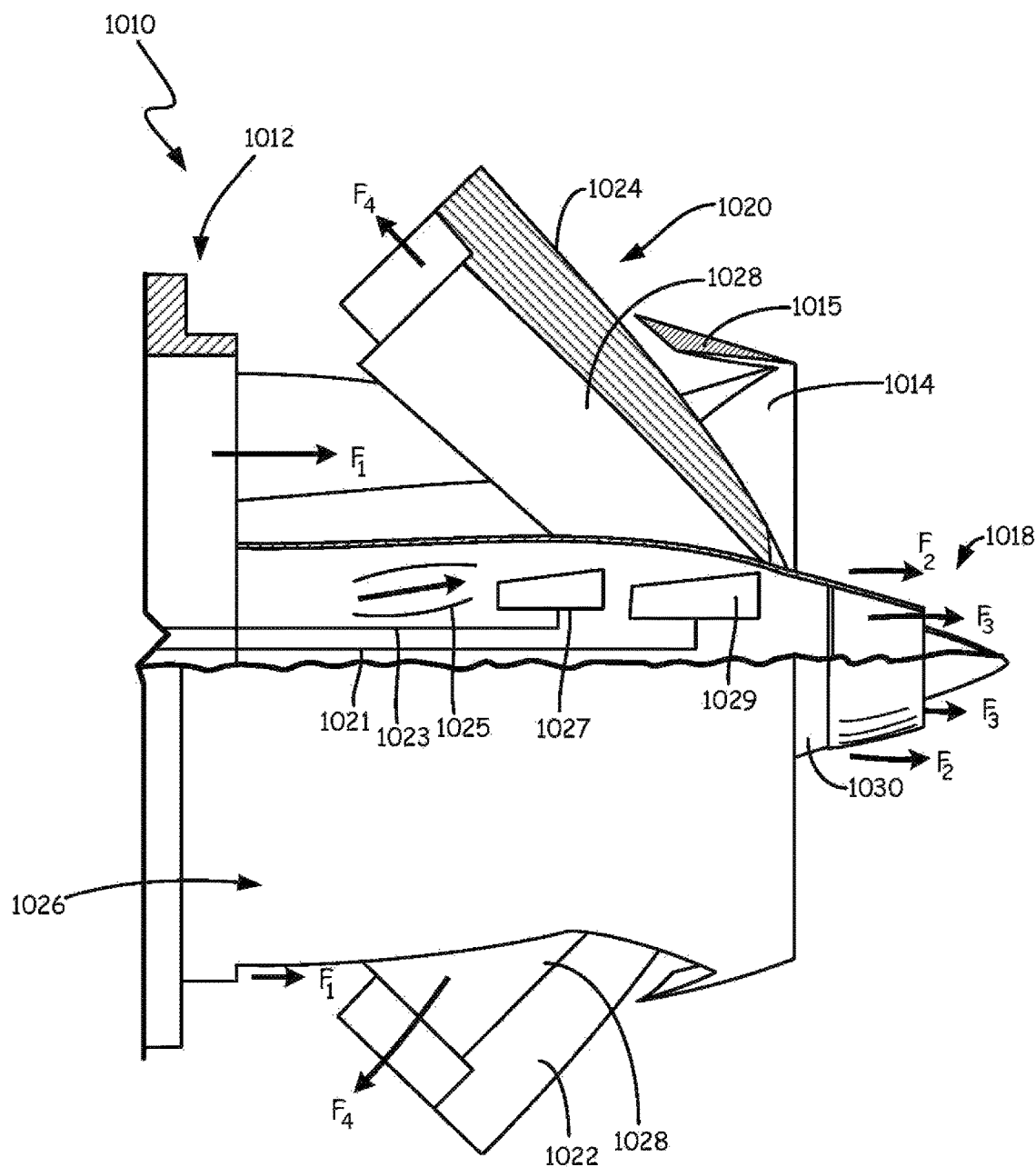
FIG. 7 is a sectional view of an aft end of the gas turbine engine of FIG. 6B, taken along line 7-7 of FIG. 6B.

FIGS. 6A, 6B, and 7 show an embodiment of gas turbine engine and nacelle assembly 1010. FIG. 1A shows a perspective view of assembly 1010 with pivot thrust reverser 1020 in the stowed position. FIG. 6B shows a perspective view of assembly 1010 with pivot thrust reverser 1020 in a deployed position. FIG. 7 shows a partial sectional view of an aft end of assembly 1010, taken along line 7-7 of FIG. 6B and reveals a portion of the interior of engine 1018. Assembly 1010 includes nacelle 1012, outer surface 1014 of nacelle 1012, projection 1015 of nacelle 1012, pylori 1016, engine 1018, nacelle opening 1019, pivot thrust reverser 1020 with first pivot door 1022 and second pivot door 1024, low pressure spool 1021, high pressure spool 1023, combustor 1025, bypass duct 1026, high pressure turbine 1027, outer surface 1028 of bypass duct 1026, low pressure turbine 1029, inner surface 1030 of bypass duct 1026, axis A of assembly 1010, fan bypass stream $F_1$, redirected fan bypass stream $F_4$, nacelle ventilation stream $F_2$, and core stream $F_3$. Certain components of assembly 1010, such as a fan, have been omitted for simplicity. Nacelle 1012 provides an annular housing within which a substantial portion of engine 1018 is located. Engine 1018 is aligned on axis A of assembly 1010 in the illustrated embodiment. Engine 1018 includes combustor 1025, high pressure turbine 1027, low pressure turbine 1029, low pressure spool 1021 which connects low pressure turbine 1029 to the fan, and high pressure spool 1023 which connects high pressure turbine 1027 to a compressor. In combination these components, among others, produce hot combustion gases that provide operational energy for engine 1018. Pylori 1016 provides a means for mounting assembly 1010 to an aircraft (not shown). Pivot thrust reverser 1020 includes both first pivot door 1022 and second pivot door 1024. As shown here, second pivot door 1024 is spaced approximately 180° from first pivot door 1022 relative to axis A of assembly 1010.

When stowed, as shown in FIG. 6A, first pivot door 1022 and second pivot door 1024 each form a portion of outer surface 1014, such that outer surface 1014 is substantially smooth at all points along an exterior of nacelle 1012, including interfaces with first pivot door 1022 and second pivot door 1024. Because first pivot door 1022 and second pivot door 1024 provide a smooth outer surface 1014 of nacelle 1012, pivot thrust reverser 1020 tends to reduce a risk of undesired aerodynamic concerns.

Inner surface 1030 of bypass duct 1026 provides an outer surface of a wall covering engine 1018. Bypass duct 1026 is defined by the annular space within nacelle 1012 between inner surface 1030 and outer surface 1028 of bypass duct 1026. A portion of outer surface 1028 of bypass duct 1026 is formed by the interior of nacelle 1012 with the other portion of outer surface 1028 of bypass duct 1026, where opening 1019 is located, formed by first pivot door 1022 and second pivot door 1024 when in the stowed position, as shown in FIG. 6A.

Both first pivot door 1022 and second pivot door 1024 can pivot on respective pivot axes that are each positionally fixed relative to assembly 1010. Thus, first pivot door 1022 and second pivot door 1024 only pivot into the deployed position, without requiring any translation of portions of nacelle 1012, first pivot door 1022, or second pivot door 1024 of assembly 1010. Both first pivot door 1022 and second pivot door 1024 pivot into opening 1019 so as to open upstream from an aft end of nacelle 1012, such that first pivot door 1022 and second pivot door 1024 pivot open inside of nacelle 1012, obstructing the flow through bypass duct 1026.

Fan bypass stream $F_1$ is relatively cold air which enters through the fan at the front end of nacelle 1012 and passes through bypass duct 1026. When pivot thrust reverser 1020 is in the stowed position, fan bypass stream $F_1$ exits from an aft end of nacelle 1012 and provides a majority of the propulsion generated by the high bypass gas turbine engine. However, when pivot thrust reverser 1020 is in the deployed position, as shown in FIGS. 6B and 7, first pivot door 1022 and second pivot door 1024 open inside of nacelle 1012 and obstruct at least a portion of the flow of fan bypass stream $F_1$ through bypass duct 1026, such that a redirected fan bypass stream $F_4$ no longer exits from the aft end of nacelle 1012, but is instead diverted in another direction. Redirected fan bypass stream $F_4$ is redirected by deployed pivot thrust reverser 1020 to flow in the forward, or upstream, direction shown here. Importantly, pivot thrust reverser 1020 is configured such that there need not be any actuators, linkages, or other obstructions present in $F_{1'}$ flow path when pivot thrust reverser 1020 is in the deployed position, which could otherwise obstruct the flow of fan bypass stream $F_{1'}$ in the forward direction, thus reducing the effectiveness of pivot thrust reverser 1020. Redirecting fan bypass stream $F_{1'}$ as shown can not only prevent fan bypass stream $F_1$ from providing forward propulsion, but can also actively provide deceleration. Yet, nacelle ventilation stream $F_2$ and core stream $F_3$, which flow through the inside of engine 1018, can remain unobstructed and continue to flow out downstream of engine 1018 when pivot thrust reverser 1020 is deployed in substantially the same manner as when pivot thrust reverser 1020 is in the stowed position.

Figure 8:
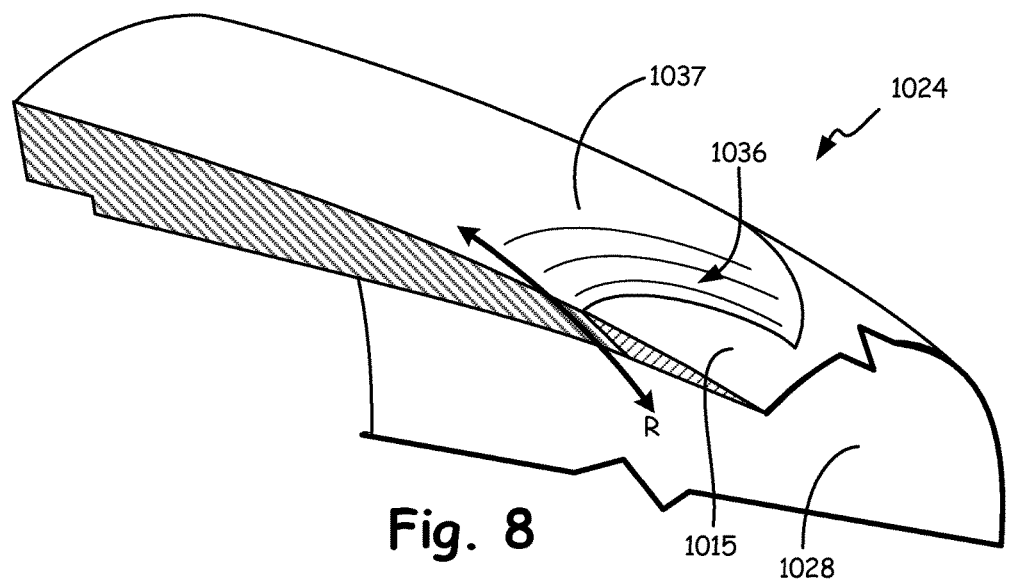
FIG. 8 is a perspective view of a pivot door of the thrust reverser and a portion of a bypass duct surface.

FIG. 8 is a perspective view of second pivot door 1024 of pivot thrust reverser 1020. In addition to a portion of outer surface 1028 of bypass duct 1026, also shown are edge curvature 1036 and rotational curvature R. For pivot thrust reverser 1020 to be effective, the pivot doors, including second pivot door 1024, must be able to pivot and open at an appropriate angle into the deployed position without being obstructed by projection 1015 of nacelle 1012. If the pivot doors are obstructed from opening at the appropriate angle by projection 1015 of nacelle 1012, fan bypass stream $F_1$ will not be redirected in the forward direction. To avoid this obstruction, the pivot axis for second pivot door 1024 must be placed at a location on nacelle 1012 that allows second pivot door 1024 to pivot along rotational curvature R. Furthermore, second pivot door 1024 can have edge curvature 1036 to allow second pivot door 1024 to tightly surround inner surface 1030 of bypass duct 1026, as will be discussed below.

Figure 9:
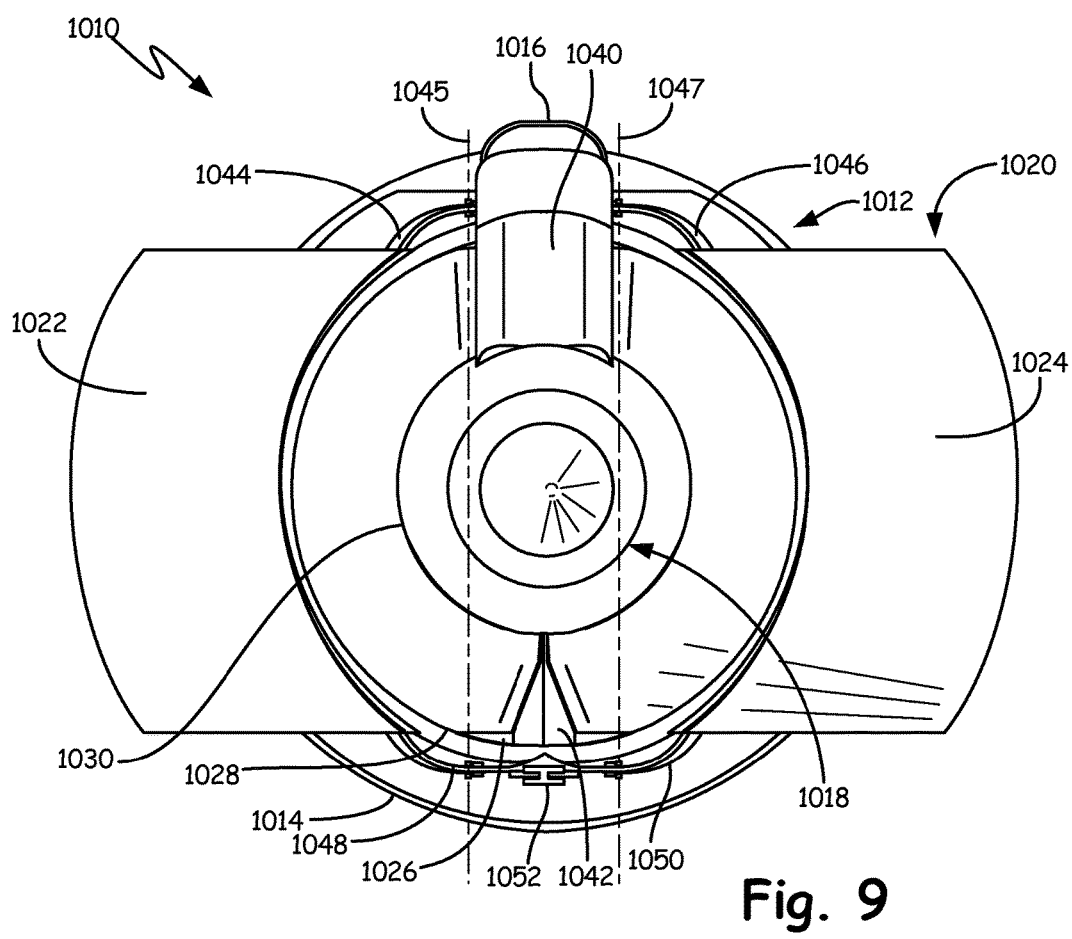
FIG. 9 is an aft elevation view of the gas turbine engine shown with the thrust reverser in a deployed position and interior structures of the engine omitted.

FIG. 9 is an aft elevation view of assembly 1010 shown with pivot thrust reverser 1020 in the deployed position, and certain interior structures of engine 1018 (e.g., turbine blades) omitted for simplicity. As shown in FIG. 9, assembly 1010 includes upper bifurcation (bi-fi) fairing 1040, lower bi-fi fairing 1042, linkages 1044 and 1048 of first pivot door 1022, linkages 1046 and 1050 of second pivot door 1024, pivot axis 1045 of first pivot door 1022, pivot axis 1047 of second pivot door 1024, and actuator 1052. Engine 1018 is centered inside nacelle 1012, in the illustrated embodiment, and thus is axially aligned with the engine fan at the front end of nacelle 1012 (axis A of FIG. 6A). Upper bi-fi fairing 1040 and lower bi-fi fairing 1042 serve to interconnect nacelle 1012 and engine 1018, as well as provide additional stiffness for nacelle 1012 and space for wires, tubes and other similar components. Linkage 1044 provides a hinged connection between first pivot door 1022 and pivot axis 1045, with linkage 1044 fixed to nacelle 1012 at pivot axis 1045. In the same manner, linkage 1046 provides a hinged connection between second pivot door 1024 and pivot axis 1047, with linkage 1046 fixed to nacelle 1012 at pivot axis 1047. Pivot axis 1045 and pivot axis 1047 can be positionally fixed relative to assembly 1010, nacelle 1012, and/or engine 1018. Linkage 1048 provides a connection between first pivot door 1022 and actuator 1052, while linkage 1050 provides a connection between second pivot door 1024 and actuator 1052.

Actuator 1052 pivots both first pivot door 1022 and second pivot door 1024 from the stowed position to the deployed position without translation of first pivot door 1022, second pivot door 1024, or any portion of nacelle 1012. In the deployed position shown, first pivot door 1022 and second pivot door 1024 circumferentially surround inner surface 1030 of bypass duct 1026. First pivot door 1022 and second pivot door 1024 are configured to circumferentially surround inner surface 1030 of bypass duct 1026 such that an at least partially sealing mating relationship is formed and there is relatively little leakage of fan bypass stream $F_1$ (the only leakage coming from portions where bypass duct 1026 is visible). This means that nearly all of fan bypass stream $F_1$ is redirected, resulting in a highly efficient pivot thrust reverser 1020. Yet, at the same time entire pivot thrust reverser 1020 can be deployed by a single actuator 1052, and therefore, provides a simplified design requiring minimal parts, and thus increases reliability and reduces maintenance costs.

Figure 10:
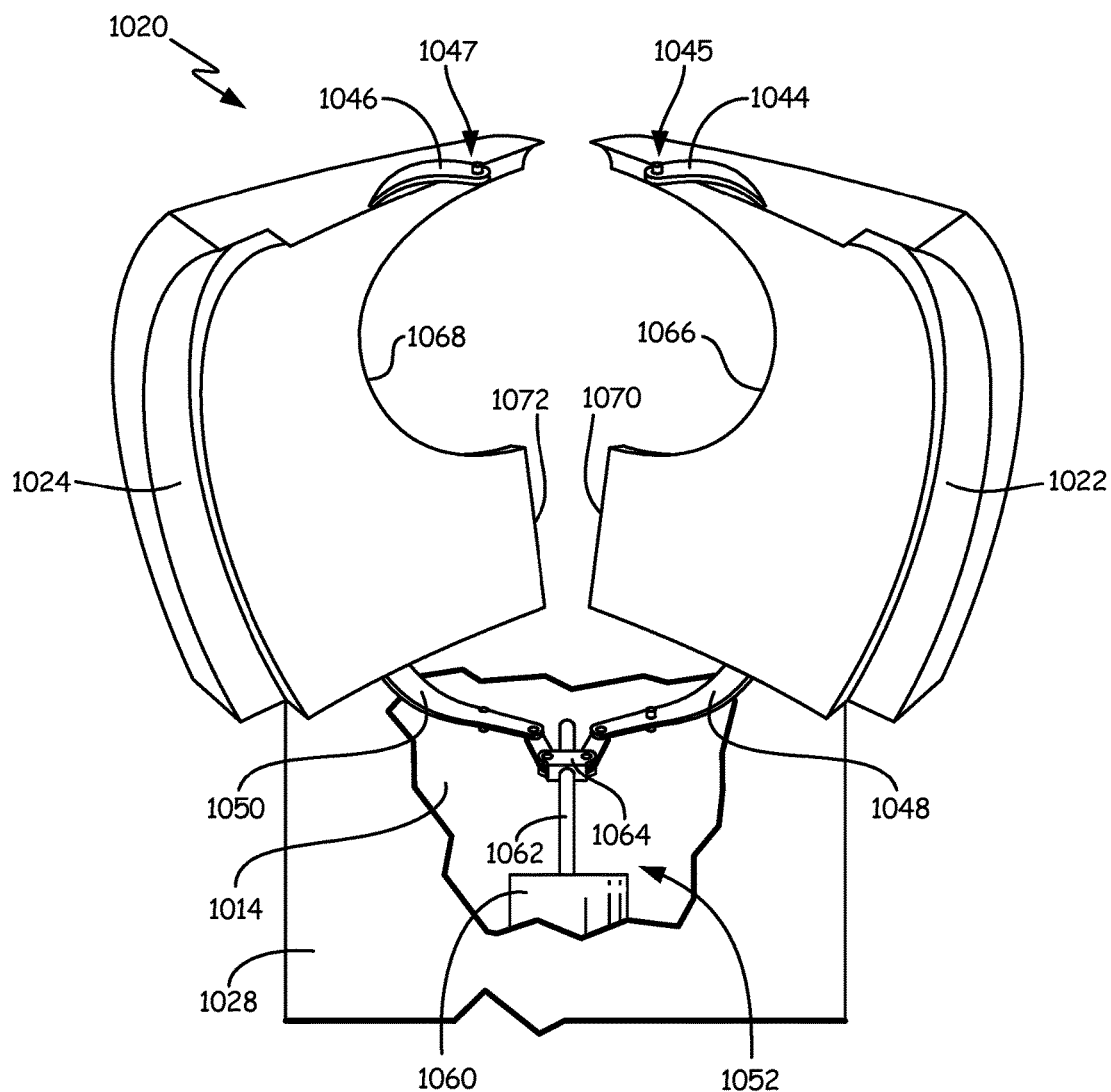
FIG. 10 is a perspective view of the thrust reverser with a single actuator in a deployed position.

FIG. 10 is a perspective view of pivot thrust reverser 1020 with a single actuator 1052 in a deployed position. Certain assembly 1010 components are left out for simplicity. Included, in addition to that shown and described previously, are motor 1060, threaded rod 1062, threaded knucklehead 1064, cutouts 1066 and 1068, and aft edges 1070 and 1072. Actuator 1052 is located between outer surface 1028 of bypass duct 1026 and outer surface 1014 of nacelle 1012 (see also FIG. 9). Actuator 1052 can be, for example, a bolt screw linear actuator as shown here that includes motor 1060, threaded rod 1062, and threaded knucklehead 1064. However, various other types of actuators can also be used in alternate embodiments to pivot both first pivot door 1022 and second pivot door 1024 between the stowed and deployed positions. Motor 1060 moves threaded knucklehead 1064 down threaded rod 1062 towards motor 1060, and in so doing, simultaneously pivots both first pivot door 1022 and second pivot door 1024 from the stowed position to the deployed position on fixed pivot axes 1045 and 1047 respectively. Linkages 1044 and 1046 are secured to nacelle 1012 in the illustrated embodiment, and thus pivot axes 1045 and 1047 are fixed in place relative to nacelle 1012. Pivot axis 1045 is spaced from first pivot door 1022 and extends linearly from linkage 1044 to linkage 1048. Similarly, pivot axis 1047 is spaced from second pivot door 1024 and extends linearly from linkage 1046 to linkage 1050. Because pivot axes 1045 and 1047 are fixed relative to nacelle 1012, first pivot door 1022 and second pivot door 1024 are pivoted by actuator 1052 between stowed and deployed positions without translating (relative to assembly 1010).

Additionally, first pivot door 1022 contains cutout 1066 in aft edge 1070 and second pivot door 1024 contains cutout 1068 in aft edge 1072. Both cutouts 1066 and 1068 are located on lower portions of aft edges 1070 and 1072 respectively. When in the deployed position, as shown here, aft edge 1070 of first pivot door 1022 faces aft edge 1072 of second pivot door 1024. As a result, cutout 1066 is aligned to face cutout 1068 when pivot doors 1022 and 1024 are deployed, forming an opening in pivot thrust reverser 1020 to accommodate engine 1018. Both cutout 1066 and cutout 1068 can be arc-shaped, resulting in the opening in pivot thrust reverser 1020 being generally circular in shape. However, in alternative embodiments, cutouts 1066 and 1068 can have various different shapes and be placed at any location on first pivot door 1022 and second pivot door 1024.

The present embodiments provide a highly effective thrust reverser 1020 for use in a gas turbine engine. This is because configuring pivot doors 1022 and 1024 with cutouts 1066 and 1068 to surround a portion of inner surface 1030 of bypass duct 1026 as shown allows nearly all of fan bypass stream $F_1$ to be redirected in the appropriate direction, while at the same time minimizing the number of components needed to pivot both pivot doors 1022 and 1024 from the stowed to the deployed position. This is turn decreases the weight of thrust reverser 1020 while increasing the reliability of thrust reverser 1020. Additionally, the design of thrust reverser 1020 provides a modular assembly which allows for direct mounting of thrust reverser 1020 in position.

FIGS. 11-16B, described below, illustrate another embodiment of a thrust reversing system.

Figure 11:
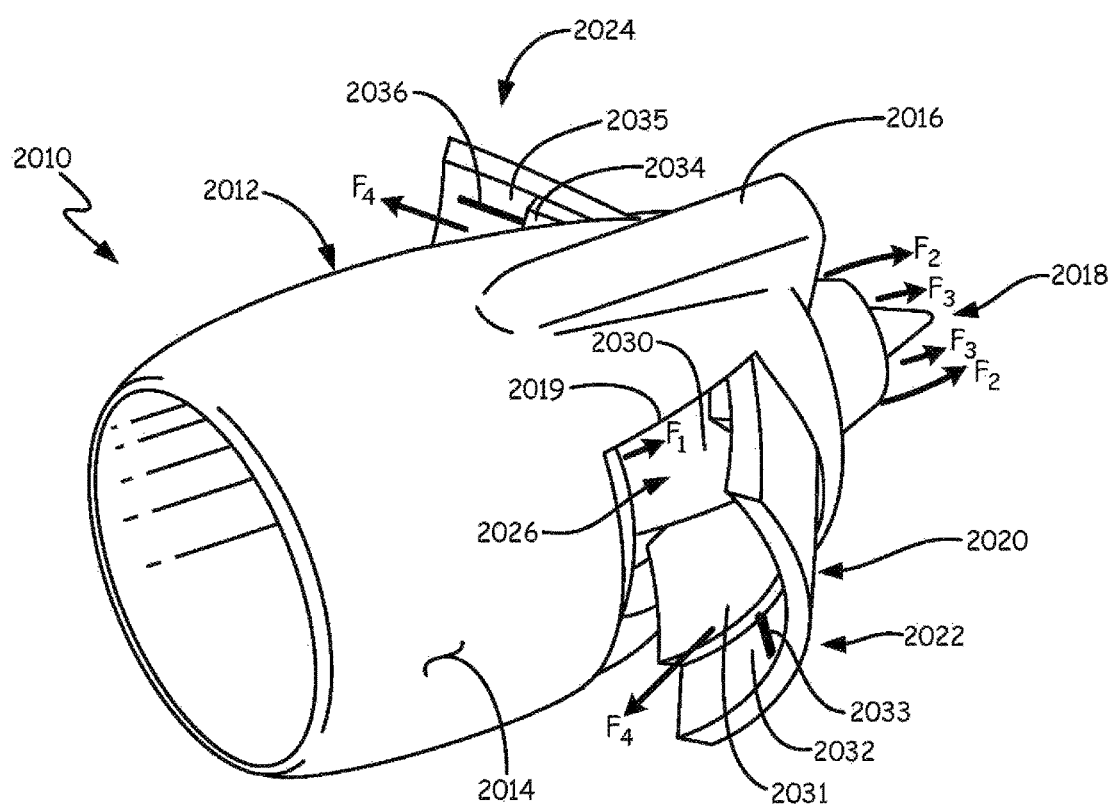
FIG. 11 is a perspective view of a gas turbine engine and nacelle assembly with the pivot thrust reverser shown in a deployed position.
Figure 12:
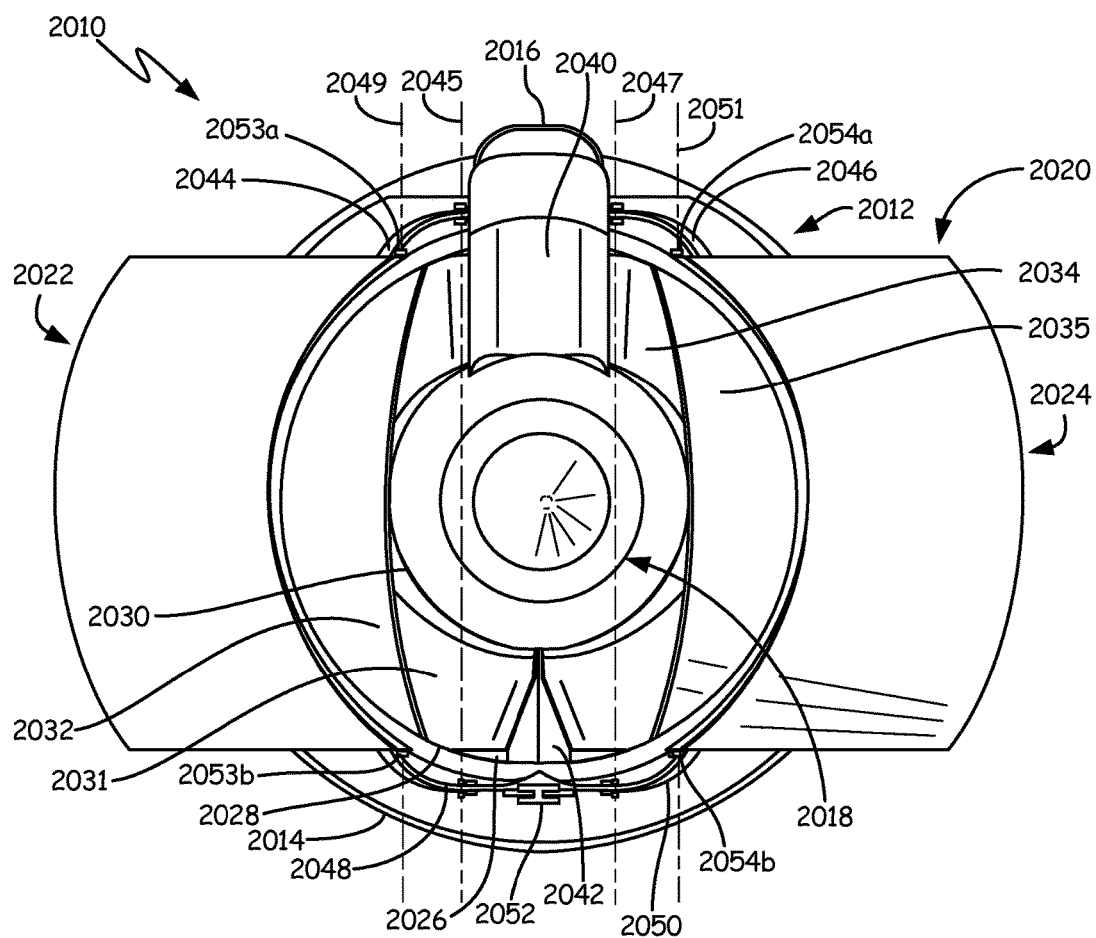
FIG. 12 is an aft elevation view of the gas turbine engine and nacelle of FIG. 11 with interior structures of the engine omitted.

FIGS. 11 and 12 show an embodiment of gas turbine engine and nacelle assembly 2010. In a stowed configuration, gas turbine engine and nacelle assembly 2010 appear nearly identical to engine and nacelle assembly 1010, as shown in FIG. 6A. FIG. 11 shows a perspective view of assembly 2010 with pivot thrust reverser 2020 in a deployed position. FIG. 12 is an aft elevation view of assembly 2010 shown with pivot thrust reverser 2020 in the deployed position. Assembly 2010 includes nacelle 2012, outer surface 2014 of nacelle 2012, pylori 2016, engine 2018, nacelle opening 2019, pivot thrust reverser 2020 with first tandem pivot door subassembly 2022 and second tandem pivot door subassembly 2024, bypass duct 2026, outer surface 2028 and inner surface 2030 of bypass duct 2026, inner panel 2031 and outer panel 2032 of first tandem pivot door subassembly 2022, first sliding rail 2033, inner panel 2034 and outer panel 2035 of second tandem pivot door subassembly 2024, second sliding rail 2036, upper bifurcation (bi-fi) fairing 2040, lower bi-fi fairing 2042, linkages 2044 and 2048 of first tandem pivot door subassembly 2022, linkages 2046 and 2050 of second tandem pivot door subassembly 2024, pivot axis 2045 of inner panel 2031, pivot axis 2047 of inner panel 2034, pivot axis 2049 of outer panel 2032, pivot axis 2051 of outer panel 2035, actuator 2052, fixed pivot connection points 2053a and 2053b, fixed pivot connection points 2054a and 2054b, fan bypass stream $F_1$, redirected fan bypass stream $F_4$, nacelle ventilation stream $F_2$, and core stream $F_3$. Certain components of assembly 2010, such as a fan of engine 2018, have been omitted for simplicity. Nacelle 2012 provides an annular housing within which a substantial portion of engine 2018 is located. Engine 2018 is aligned on axis A of assembly 2010 in the illustrated embodiment. Engine 2018 includes a compressor section, a combustor section, and a turbine section (those sections not specifically shown), which in combination produce hot combustion gases that provide operational energy for engine 2018. Pylori 2016 provides a means for mounting assembly 2010 to an aircraft (not shown). Pivot thrust reverser 2020 includes both first tandem pivot door subassembly 2022 and second tandem pivot door subassembly 2024. As shown here, second tandem pivot door subassembly 2024 is spaced approximately 180° from first tandem pivot door subassembly 2022 relative to axis A of assembly 2010.

When stowed, as previously described with respect to the embodiment shown in FIG. 6A, first tandem pivot door subassembly 2022 and second tandem pivot door subassembly 2024 each form a portion of outer surface 2014, such that outer surface 2014 is substantially smooth at all points along an exterior of nacelle 2012, including interfaces with first tandem pivot door subassembly 2022 and second tandem pivot door subassembly 2024. Because first tandem pivot door subassembly 2022 and second tandem pivot door subassembly 2024 provide a smooth outer surface 2014 of nacelle 2012, pivot thrust reverser 2020 tends to reduce a risk of undesired aerodynamic concerns.

Inner surface 2030 of bypass duct 2026 provides an outer surface of a wall covering engine 2018. Bypass duct 2026 is defined by the annular space within nacelle 2012 between outer surface 2030 and outer surface 2028 of bypass duct 2026. Outer surface 2028 of bypass duct 2026 is formed by both a duct wall at the interior of nacelle 2012 and first tandem pivot door subassembly 2022 and second tandem pivot door subassembly 2024 when in the stowed position at opening 2019. Inner panel 2031 and outer panel 2032 of first tandem pivot door subassembly 2022 are connected by parallel sliding rails (e.g., two sliding rails) in this embodiment. However only first sliding rail 2033 is visible in FIG. 11. Inner panel 2034 and outer panel 2035 of second tandem pivot door subassembly 2024 are also connected by parallel sliding rails in this embodiment. However, only second sliding rail 2036 is visible in FIG. 11 (the other sliding rails are visible in FIG. 12). In other embodiments, the connection between inner panels 2031 and 2034 and outer panels 2032 and 2035 can be made by a single sliding rail or more than two sliding rails, and the sliding rails can be located in places at interfaces between inner panels 2031 and 2034 and outer panels 2032 and 2035 as desired for particular applications.

Both first tandem pivot door subassembly 2022 and second tandem pivot door subassembly 2024 can pivot on respective pivot axes that are each positionally fixed relative to their respective mounting locations. Thus, first tandem pivot door subassembly 2022 and second tandem pivot door subassembly 2024 can merely pivot into the deployed position, without requiring any translation of portions of nacelle 2012, first tandem pivot door subassembly 2022, or second tandem pivot door subassembly 2024 of assembly 2010. Both first tandem pivot door subassembly 2022 and second tandem pivot door subassembly 2024 pivot into opening 2019 so as to open upstream from an aft end of nacelle 2012, such that first tandem pivot door subassembly 2022 and second tandem pivot door subassembly 2024 pivot open inside of nacelle 2012, obstructing flow through bypass duct 2026.

Fan bypass stream $F_1$ is relatively cold air which enters through the fan at the front end of nacelle 2012 and passes through bypass duct 2026. When pivot thrust reverser 2020 is in the stowed position, fan bypass stream $F_1$ exits from an aft end of nacelle 2012 and can provide a majority of the propulsion generated by high bypass gas turbine engine 2018. However, when pivot thrust reverser 2020 is in the deployed position, as shown in FIGS. 11 and 12, first tandem pivot door subassembly 2022 and second tandem pivot door subassembly 2024 open inside of nacelle 2012 and obstruct at least a portion of the flow of fan bypass stream $F_1$ through bypass duct 2026, such that a redirected fan bypass stream $F_4$ no longer exits from the aft end of nacelle 2012, but is instead diverted in another direction. Redirected fan bypass stream $F_4$ is redirected by deployed pivot thrust reverser 2020 to flow in the forward, or upstream, direction shown in FIGS. 11 and 12. Pivot thrust reverser 2020 is configured such that there need not be any actuators, linkages, or other obstructions present in $F_4$ flow path when pivot thrust reverser 2020 is in the deployed position, which could otherwise obstruct the flow of redirected fan bypass stream $F_{1'}$ in the forward direction, thus reducing the effectiveness of pivot thrust reverser 2020. Redirecting fan bypass stream $F_{1'}$ as shown can restrict or prevent fan bypass stream $F_1$ from providing forward propulsion, but can also actively provide deceleration. Yet, nacelle ventilation stream $F_2$ and core stream $F_3$, which flow through the inside of engine 2018, can remain substantially unobstructed and continue to flow out downstream of engine 2018 when pivot thrust reverser 2020 is deployed in substantially the same manner as when pivot thrust reverser 2020 is in the stowed position.

Additionally, in the illustrated embodiment, outer panel 2032 is larger than inner panel 2031 of first tandem pivot door subassembly 2022 and outer panel 2035 is larger than inner panel 2034 of second tandem pivot door subassembly 2024. By using larger outer panels 2032 and 2035, outer panels 2032 and 2035 not only provide structural support to inner panels 2031 and 2034 respectively, but also take on functional roles. Larger outer panels 2032 and 2035 provide additional guidance, in addition to the guidance provided by inner panels 2031 and 2034, for redirecting fan bypass stream $F_{1'}$ in the appropriate forward direction needed to provide deceleration. Consequently, by further guiding redirected fan bypass stream $F_4$ in the forward direction, pivot thrust reverser 2020 operates more effectively. Furthermore, larger outer panels 2032 and 2035 also can function as an air break, and thus provide deceleration in addition to that provided by redirected fan bypass stream $F_4$.

Engine 2018 is centered inside nacelle 2012, in the illustrated embodiment, and thus is axially aligned with the engine fan at the front end of nacelle 12. Upper bi-fi fairing 2040 and lower bi-fi fairing 2042 serve to interconnect nacelle 2012 and engine 2018, as well as provide additional stiffness for nacelle 2012 and space for wires, tubes and other similar components.

In the illustrated embodiment, as best shown in FIG. 12, linkage 2044 provides a hinged connection between inner panel 2031 (of first tandem pivot door subassembly 2022) and pivot axis 2045, with linkage 2044 fixed to nacelle 2012 at pivot axis 2045. In the same manner, linkage 2046 provides a hinged connection between inner panel 2034 (of second tandem pivot door subassembly 2024) and pivot axis 2047, with linkage 2046 fixed to nacelle 2012 at pivot axis 2047. Pivot axis 2045 of inner panel 2031 and pivot axis 2047 of inner panel 2034 can be positionally fixed relative to assembly 2010, nacelle 2012, and/or engine 2018. Pivot axis 2045 is spaced from inner panel 2031 and extends from linkage 2044 to linkage 2048. Similarly, pivot axis 2047 is spaced from inner panel 2034 and extends from linkage 2046 to linkage 2050. Linkage 2048 provides a connection between inner panel 2031 and actuator 2052, while linkage 2050 provides a connection between inner panel 2034 and actuator 2052.

Outer panel 2032 (of first tandem pivot door subassembly 2022) is fixed to nacelle 2012 at fixed pivot connection points 2053a and 2053b, and pivots about pivot axis 2049. Points 2053a and 2053b provide hinge points for outer panel 2032 and are located at or near a perimeter of outer panel 2032 in nacelle 2012, between outer surface 2014 of nacelle 2012 and outer surface 2028 of bypass duct 2026, on pivot axis 2049. Outer panel 2035 (of second tandem pivot door subassembly 2024) is fixed to nacelle 2012 at fixed pivot connection points 2054a and 2054b, and pivots about pivot axis 2051. Points 2054a and 2054b provide hinge points for outer panel 2035 and are located at or near a perimeter of outer panel 2035 in nacelle 2012, between outer surface 2014 of nacelle 2012 and outer surface 2028 of bypass duct 2026, on pivot axis 2051. Pivot axis 2049 of outer panel 2032 and pivot axis 2051 of outer panel 2035 can each be positionally fixed relative to assembly 2010, nacelle 2012, and/or engine 2018. Pivot axis 2049 extends from point 2053a to point 2053b. Pivot axis 2051 extends from point 2054a to point 2054b. As shown and discussed throughout, inner panels 2031 and 2034 maintain connection with outer panels 2032 and 2035 by sliding rails. As a result, inner panel 2031 and outer panel 2032 of first tandem pivot door subassembly 2022 can pivot simultaneously about different pivot axes 2045 and 2049 without translating relative to those axes 2045 and 2049. Similarly, inner panel 2034 and outer panel 2035 of second tandem pivot door subassembly 2024 can pivot simultaneously about different pivot axes 2047 and 2051 without translating.

Actuator 2052 pivots both first tandem pivot door subassembly 2022 and second tandem pivot door subassembly 2024 from the stowed position to the deployed position without translation of first tandem pivot door subassembly 2022, second tandem pivot door subassembly 2024, or any portion of nacelle 2012. In the deployed position shown in FIGS. 11 and 12, first tandem pivot door subassembly 2022 and second tandem pivot door subassembly 2024 circumferentially surround a portion of inner surface 2030 of bypass duct 2026. Inner panel 2031 of first tandem pivot door subassembly 2022 and inner panel 2034 of second tandem pivot door subassembly 2024 are each configured to circumferentially surround inner surface 2030 of bypass duct 2026 such that an at least partially sealing, mating relationship is formed and there is relatively little leakage of fan bypass stream $F_1$ (the only leakage coming from portions where bypass duct 2026 is visible). This means that nearly all of fan bypass stream $F_1$ is redirected, resulting in a highly efficient pivot thrust reverser 2020. Yet, at the same time entire pivot thrust reverser 2020 can be deployed by a single actuator 2052, and therefore, provides a simplified design requiring minimal parts, and thus increases reliability and reduces maintenance costs.

Figure 13:
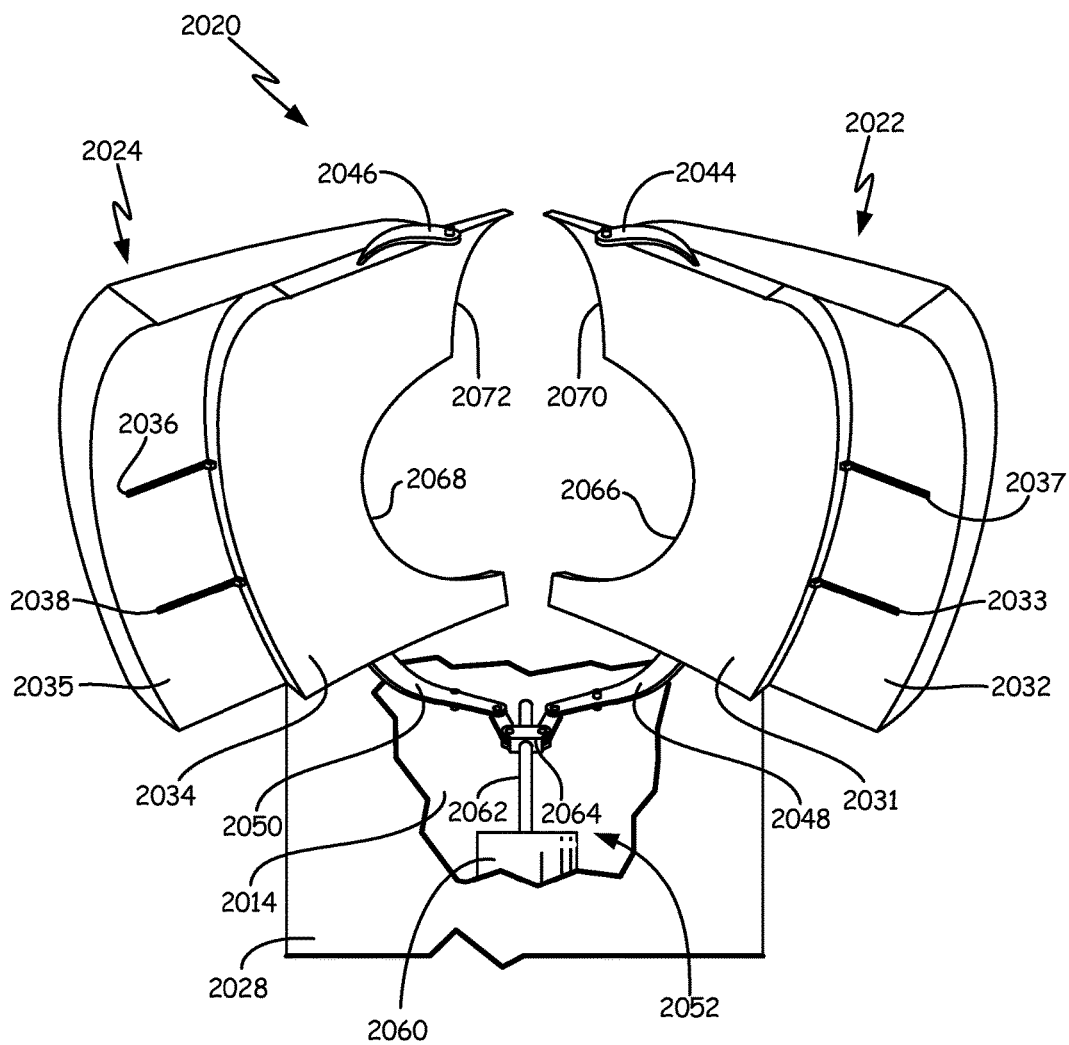
FIG. 13 is a perspective view of the pivot thrust reverser, with a single actuator, in the deployed position showing the inner panels connected to the outer panels by sliding rails.

FIG. 13 is a perspective view of pivot thrust reverser 2020 with a single actuator 2052 in a deployed position. Certain assembly 2010 components are left out for simplicity. Included, in addition to that shown and described previously, are third sliding rail 2037, fourth sliding rail 2038, motor 2060, threaded rod 2062, threaded knucklehead 2064, cutouts 2066 and 2068, and aft edges 2070 and 2072. Actuator 2052 is located between outer surface 2028 of bypass duct 2026 and outer surface 2014 of nacelle 2012 (see also FIG. 12). Actuator 2052 can be, for example, a bolt screw linear actuator as shown here that includes motor 2060, threaded rod 2062, and threaded knucklehead 2064. However, various other types of actuators can also be used in alternate embodiments to pivot both first tandem pivot door subassembly 2022 and second tandem pivot door subassembly 2024 between the stowed and deployed positions. Motor 2060 moves threaded knucklehead 2064 down threaded rod 2062 towards motor 2060, and in so doing, pivots inner panel 2031 on pivot axis 2045. Then, due to the connection between inner panel 2031 and outer panel 2032 by sliding rails 2033 and 2037, outer panel 2032 is simultaneously made to pivot on pivot axis 2049. At the same time, inner panel 2034 is also pivoted on pivot axis 2047, and due to the connection between inner panel 2034 and outer panel 2032 by sliding rails 2036 and 2038, outer panel 2035 is simultaneously made to pivot on pivot axis 2051. In this manner, first tandem pivot door subassembly 2022 and second tandem pivot door subassembly 2024 are pivoted by single actuator 2052 about different pivot axes between stowed and deployed positions without translating (relative to assembly 2010).

Additionally, inner panel 2031 of first tandem pivot door subassembly 2022 contains cutout 2066 in aft edge 2070 and inner panel 2034 of second tandem pivot door subassembly 2024 contains cutout 2068 in aft edge 2072. Both cutouts 2066 and 2068 are located on upper portions of aft edges 2070 and 2072, respectively. When in the deployed position, as shown here, aft edge 2070 of inner panel 2031 faces aft edge 2072 of inner panel 2034. As a result, cutout 2066 is aligned to face cutout 2068 when tandem pivot door subassemblies 2022 and 2024 are deployed, forming an opening in pivot thrust reverser 2020 to accommodate engine 2018. Both cutout 2066 and cutout 2068 can be arc-shaped, resulting in the opening in pivot thrust reverser 2020 being generally circular in shape. However, in alternative embodiments, cutouts 2066 and 2068 can have various different shapes and be placed at any location on inner panels 2031 and 2034.

FIG. 14 is an exploded perspective view of inner panel 2031 and outer panel 2032 of first tandem pivot door subassembly 2022. Included, in addition to that shown and described previously, are inward-facing protrusion 2067 and side protrusion 2069 on outer panel 2032. Inner panel 2031 is placed on top of outer panel 2032 with the connection made by sliding rails 2033 and 2037. In this embodiment, inward-facing protrusion 2067 is of a shape complimentary with cutout 2066 in aft edge 2070 of inner panel 2031, such that inward-facing protrusion 2067 protrudes into the location of cutout 2066 when inner panel 2031 is placed on top of outer panel 2032. Also, side protrusion 2069 is of a shape complimentary with curved aft edge 2070 of inner panel 2031, such that side protrusion 2069 protrudes up from an interface of aft edge 2070 and side protrusion 2069. Protrusions 2067 and 2069 then allow first tandem pivot door subassembly 2022 to both provide a substantially smooth outer surface 2028 of bypass duct 2026 and a complete outer surface 2014 of nacelle 2012 when first tandem pivot door subassembly 2022 is stowed. Consequently, fan bypass stream $F_1$ experience relatively little turbulence when passing through bypass duct 2026 at the location where outer surface 2028 of bypass duct 2026 is formed by stowed first tandem pivot door subassembly 2022. This allows assembly 2010 to produce efficient and effective propulsion even with pivot thrust reverser 2020 included.

Figure 15A:
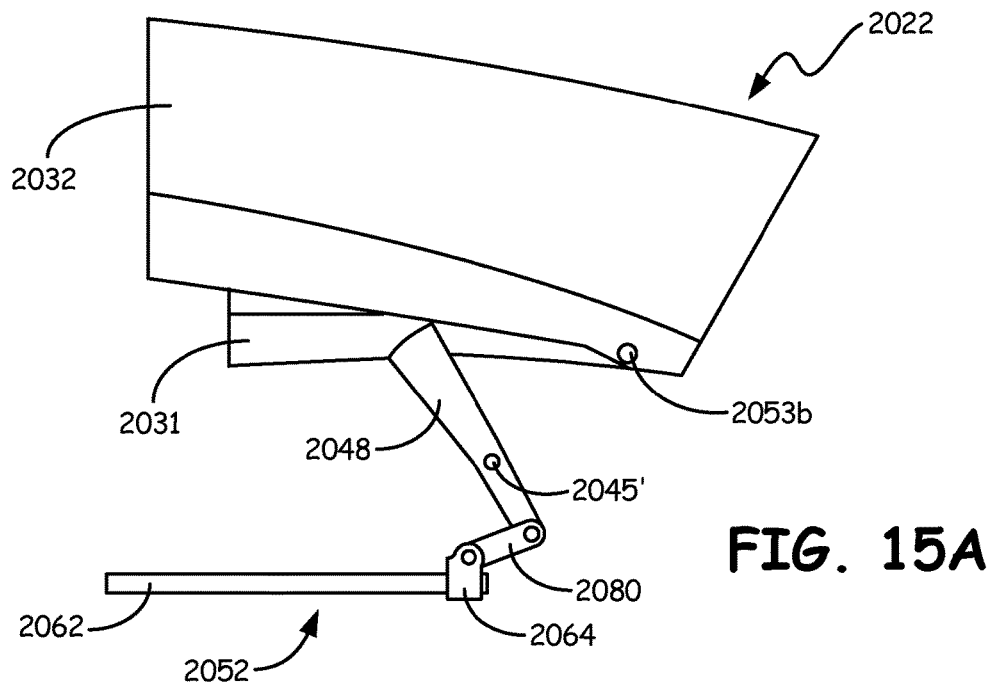
FIG. 15A is a plan view of the actuator and tandem pivot door subassembly, shown in isolation, in the stowed position.
Figure 15B:
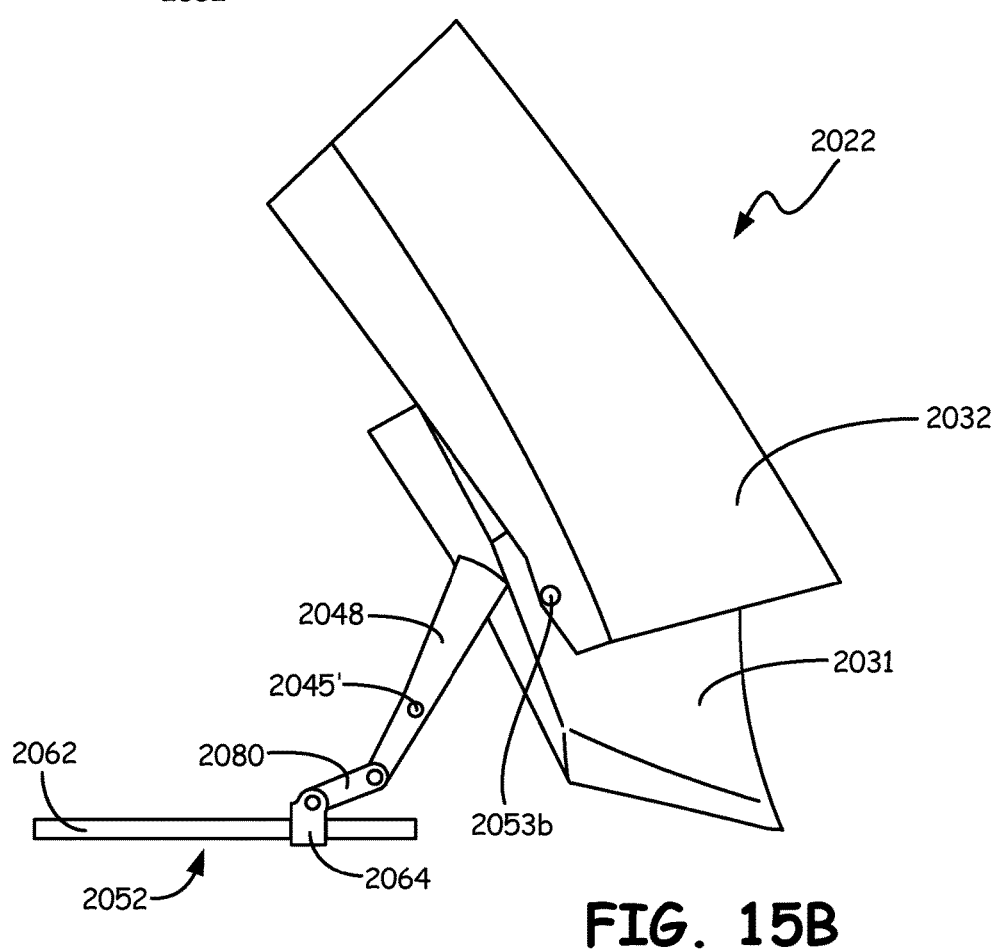
FIG. 15B is a plan view of the actuator and tandem pivot door subassembly, shown in isolation, in the deployed position.

FIGS. 15A and 15B show a plan view of actuator 2052 and first tandem pivot door subassembly 2022 in isolation, with first tandem pivot door subassembly 2022 pivoted from the stowed to the deployed position. FIG. 15A shows first tandem pivot door subassembly 2022 in the stowed position. FIG. 15B shows first tandem pivot door subassembly 2022 pivoted to the deployed position. Included, in addition to that shown and described previously, are fixed pivot point 2045' and link 2080. Fixed pivot point 2045' is located on pivot axis 2045 (shown in FIG. 12) and is a pivot connection point about which inner panel 2031 rotates. Point 2053b, as discussed with respect to FIG. 12, is located on pivot axis 2049, and is a pivot connection point about which outer panel 2032 is hinged to nacelle 2012 and pivotally rotates. In this embodiment, point 2053b is located at or near a perimeter of outer panel 2032, and more specifically is at or near an aft end of outer panel 2032 which can pivot inside of nacelle 2012. Link 2080 provides a connection between threaded knucklehead 2064 of actuator 2052 and linkage 2048.

As first tandem pivot door subassembly 2022 is pivoted to the deployed position, threaded knucklehead 2064 moves down threaded rod 2062. This forces inner panel 2031 to pivot about pivot axis 2045 on point 2045', and in turn, due to the connection between inner panel 2031 and outer panel 2032, forces outer panel 2032 to pivot about pivot axis 2049 on point 2053b. Outer panel 2032 stops in the position shown in FIG. 15B and does not move further along sliding rails 2033 and 2037 due to point 2053b being fixed to nacelle 2012. Therefore, first tandem pivot door subassembly 2022 is deployed by pivoting inner panel 2031 and outer panel 2032 simultaneously about different pivot points. This allows first tandem pivot door subassembly 2022 to deploy and avoid interference from nacelle 2012 that otherwise would occur due to the location of first tandem pivot door subassembly 2022.

Figure 16A:
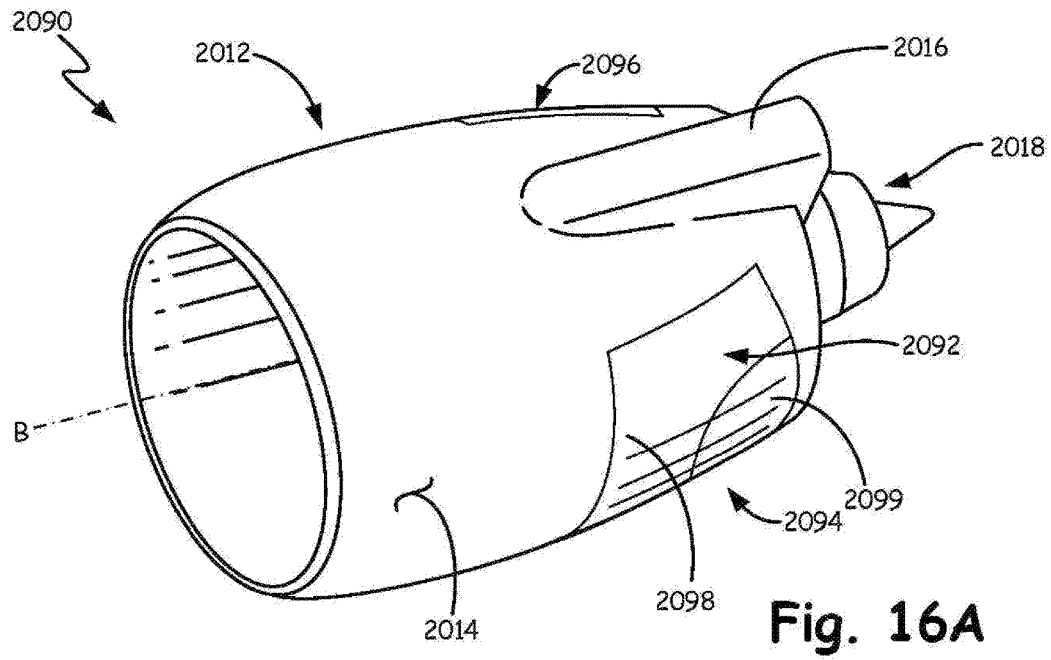
FIG. 16A is a perspective view of a gas turbine engine and nacelle assembly with another embodiment of a pivot thrust reverser according to the present invention, shown in a stowed position.
Figure 16B:
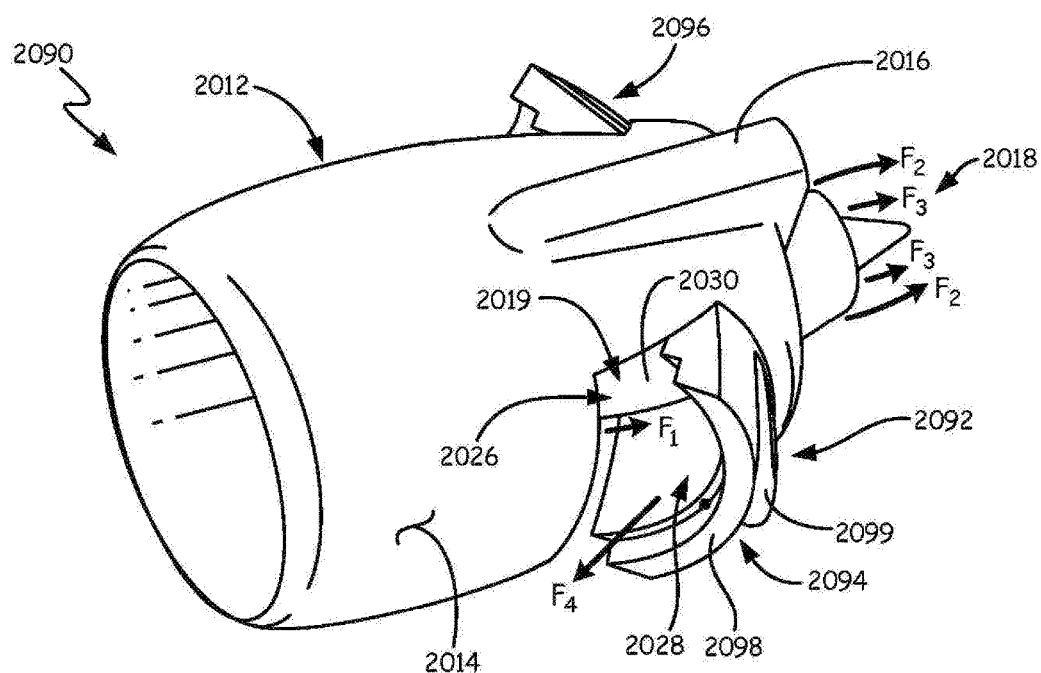
FIG. 16B is a perspective view of the gas turbine engine and nacelle assembly of FIG. 1A or 16A with the pivot thrust reverser shown in a deployed position.

FIGS. 16A and 16B show a perspective view of an embodiment of gas turbine engine and nacelle assembly 2090 with another embodiment of pivot thrust reverser 2092. FIG. 16A shows pivot thrust reverser 2092 in a stowed position, and FIG. 16B shows pivot thrust reverser 2092 in a deployed position. Assembly 2090 includes, in addition to that shown and described previously, pivot thrust reverser 2092 with first tandem pivot door subassembly 2094 and second tandem pivot door subassembly 2096, inner panel 2098 and outer panel 2099 of first tandem pivot door subassembly 2094 (second tandem pivot door subassembly 2096 also has inner and outer panels, but are not visible in these FIGS.). Outer panel 2099 is connected to inner panel 2098 by sliding rails, detailed previously. Pivot thrust reverser 2092 differs from pivot thrust reverser 2020 shown previously in that inner panel 2098 is larger than outer panel 2099. Here, outer panel 2099 serves to prevent interference with nacelle 2012 and form both a complete outer surface 2014 of nacelle 2012 at opening 2019 and outer surface 2028 of bypass duct 2026. Inner panel 2098 when stowed also forms both a portion of outer surface 2014 of nacelle 2012 at opening 2019 and outer surface 2028 of bypass duct 2026. Inner panel 2098 and outer panel 2099 are flush relative to each other when stowed. Outer panel 2099 can be both shorter in length and width than inner panel 2098. Also, outer panel 2099 can have a curved forward end when inner panel 2098 contains a cutout at an aft edge so as to provide a substantially gap free outer surface 2014 of nacelle 2012 at opening 2019 and outer surface 2028 of bypass duct 2026.

The present embodiments provide a highly effective thrust reverser for use in a gas turbine engine. This is because configuring inner panels 2031 and 2034 with cutouts 2066 and 2068 to surround inner surface 2030 of bypass duct 2026 as shown allows nearly all of fan bypass stream $F_1$ to be redirected in the appropriate direction, while at the same time minimizing the number of components needed to pivot both first and second tandem pivot door subassemblies 2022 and 2024 from the stowed to the deployed position without interference from nacelle 2012. This in turn decreases the weight of thrust reverser 2020 while increasing the reliability of thrust reverser 2020. Additionally, the design of thrust reverser 2020 provides a modular assembly which allows for direct mounting of thrust reverser 2020 in position.

Figure 17A:
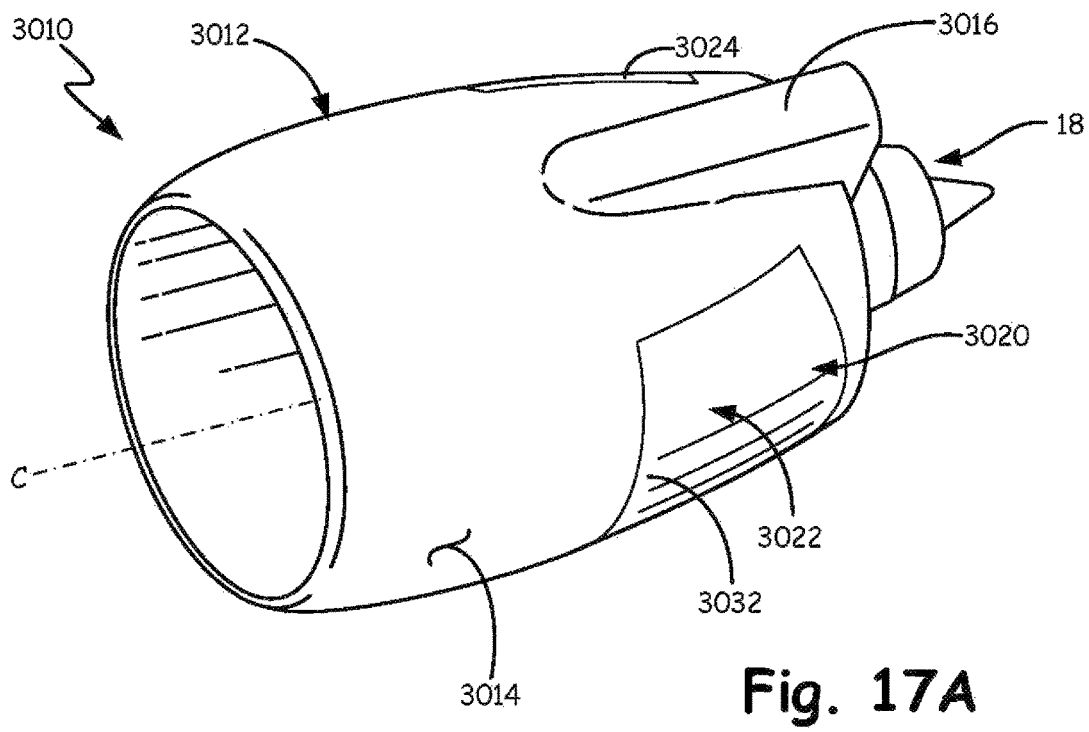
FIG. 17A is a perspective view of an embodiment of a gas turbine engine and nacelle assembly with a pivot thrust reverser according to the present invention, shown in a stowed position.
Figure 17B:
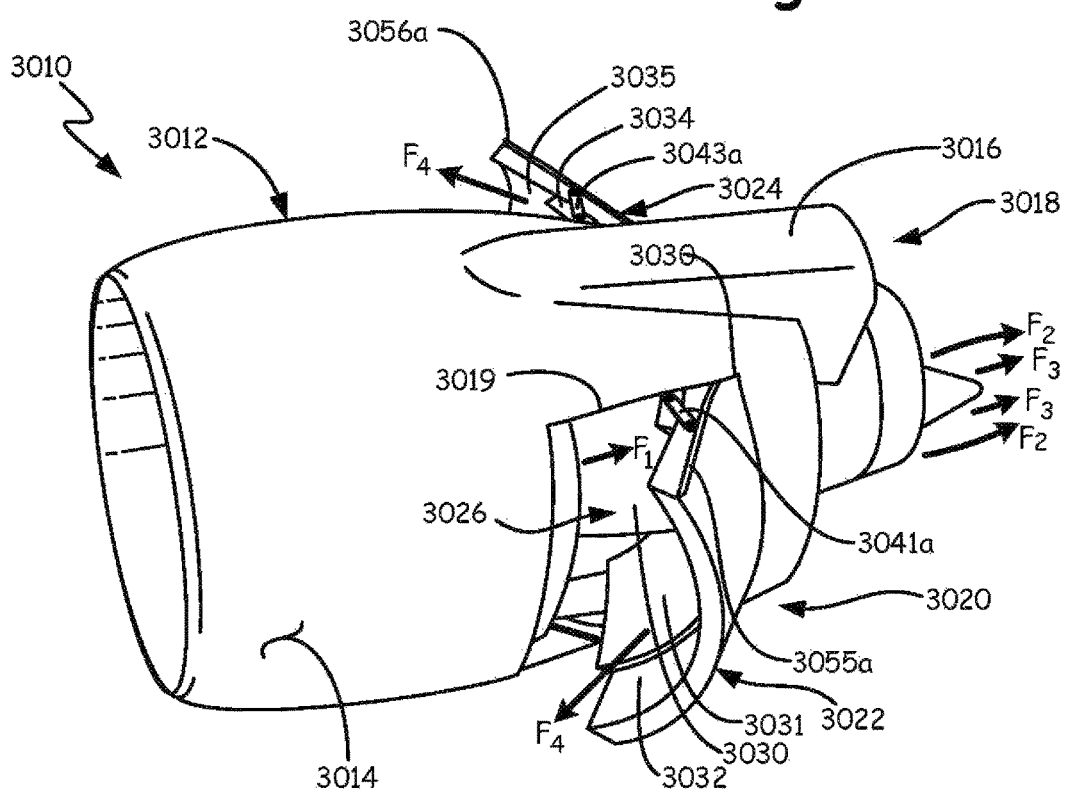
FIG. 17B is a perspective view of the gas turbine engine and nacelle assembly of FIG. 17A with the pivot thrust reverser shown in a deployed position.

FIGS. 17A and 17B show an embodiment of gas turbine engine and nacelle assembly 3010. FIG. 17A is a perspective view of assembly 3010 with pivot thrust reverser 3020 in the stowed position. FIG. 17B shows a perspective view of assembly 3010 with pivot thrust reverser 3020 in a deployed position. Assembly 3010 includes nacelle 3012, outer surface 3014 of nacelle 3012, pylori 3016, engine 3018, nacelle opening 3019, pivot thrust reverser 3020 with first tandem pivot door subassembly 3022 and second tandem pivot door subassembly 3024, bypass duct 3026, outer surface 3028 and inner surface 3030 of bypass duct 3026, inner panel 3031 and outer panel 3032 of first tandem pivot door subassembly 3022, inner panel 3034 and outer panel 3035 of second tandem pivot door subassembly 3024, upper bifurcation (bi-fi) fairing 3040, lower bi-fi fairing 3042, linkages 3044 and 3048 of first tandem pivot door subassembly 3022, linkages 3046 and 3050 of second tandem pivot door subassembly 3024, pivot axis 3045 of inner panel 3031, pivot axis 3047 of inner panel 3034, pivot axis 3049 of outer panel 3032, pivot axis 3051 of outer panel 3035, actuator 3052, fixed pivot connection points 3053a and 3053b, fixed pivot connection points 3054a and 3054b, fan bypass stream $F_1$, redirected fan bypass stream $F_4$, nacelle ventilation stream $F_2$, and core stream $F_3$. Certain components of assembly 3010, such as a fan of engine 3018, have been omitted for simplicity. Nacelle 3012 provides an annular housing within which a substantial portion of engine 3018 is located. Engine 3018 is aligned on axis C of assembly 3010 in the illustrated embodiment. Engine 3018 includes a compressor section, a combustor section, and a turbine section (those sections not specifically shown), which in combination produce hot combustion gases that provide operational energy for engine 3018. Pylori 3016 provides a means for mounting assembly 3010 to an aircraft (not shown). Pivot thrust reverser 3020 includes both first tandem pivot door subassembly 3022 and second tandem pivot door subassembly 3024. As shown here, second tandem pivot door subassembly 3024 is spaced approximately 180° from first tandem pivot door subassembly 3022 relative to axis C of assembly 3010.

When stowed, as shown in FIG. 17A, first tandem pivot door subassembly 3022 and second tandem pivot door subassembly 3024 each form a portion of outer surface 3014, such that outer surface 3014 is substantially smooth at all points along an exterior of nacelle 3012, including interfaces with first tandem pivot door subassembly 3022 and second tandem pivot door subassembly 3024. Because first tandem pivot door subassembly 3022 and second tandem pivot door subassembly 3024 provide a smooth outer surface 3014 of nacelle 3012, pivot thrust reverser 20 tends to reduce a risk of undesired aerodynamic concerns.

Inner surface 3030 of bypass duct 3026 provides an outer surface of a wall covering engine 3018. Bypass duct 3026 is defined by the annular space within nacelle 3012 between inner surface 3030 and outer surface 3028 of bypass duct 3026. Outer surface 3028 of bypass duct 3026 is formed by a duct wall at the interior of nacelle 3012, and first tandem pivot door subassembly 3022 and second tandem pivot door subassembly 3024 when in the stowed position, as shown in FIG. 17A. In this embodiment, inner panel 3031 and outer panel 3032 of first tandem pivot door subassembly 3022 are connected by a multi-bar linkage (further described with regard to FIG. 18A). Inner panel 3034 and outer panel 3035 of second tandem pivot door subassembly 3024 are also connected by another multi-bar linkage (further described with regard to FIG. 18A). In other embodiments, the connection between inner panels 3031 and 3034 and outer panels 3032 and 3035 can be made by differing numbers and configurations of linkages, or other types of mechanisms, as desired for particular applications.

Both first tandem pivot door subassembly 3022 and second tandem pivot door subassembly 3024 can pivot on respective pivot axes that are each positionally fixed relative to their respective mounting locations. Thus, first tandem pivot door subassembly 3022 and second tandem pivot door subassembly 3024 can merely pivot into the deployed position, without requiring any translation of portions of nacelle 3012, first tandem pivot door subassembly 3022, or second tandem pivot door subassembly 3024. Both first tandem pivot door subassembly 3022 and second tandem pivot door subassembly 3024 pivot into opening 3019 so as to open upstream from an aft end of nacelle 3012, such that first tandem pivot door subassembly 3022 and second tandem pivot door subassembly 3024 pivot open inside of nacelle 3012, obstructing flow through bypass duct 3026.

Figure 17C:
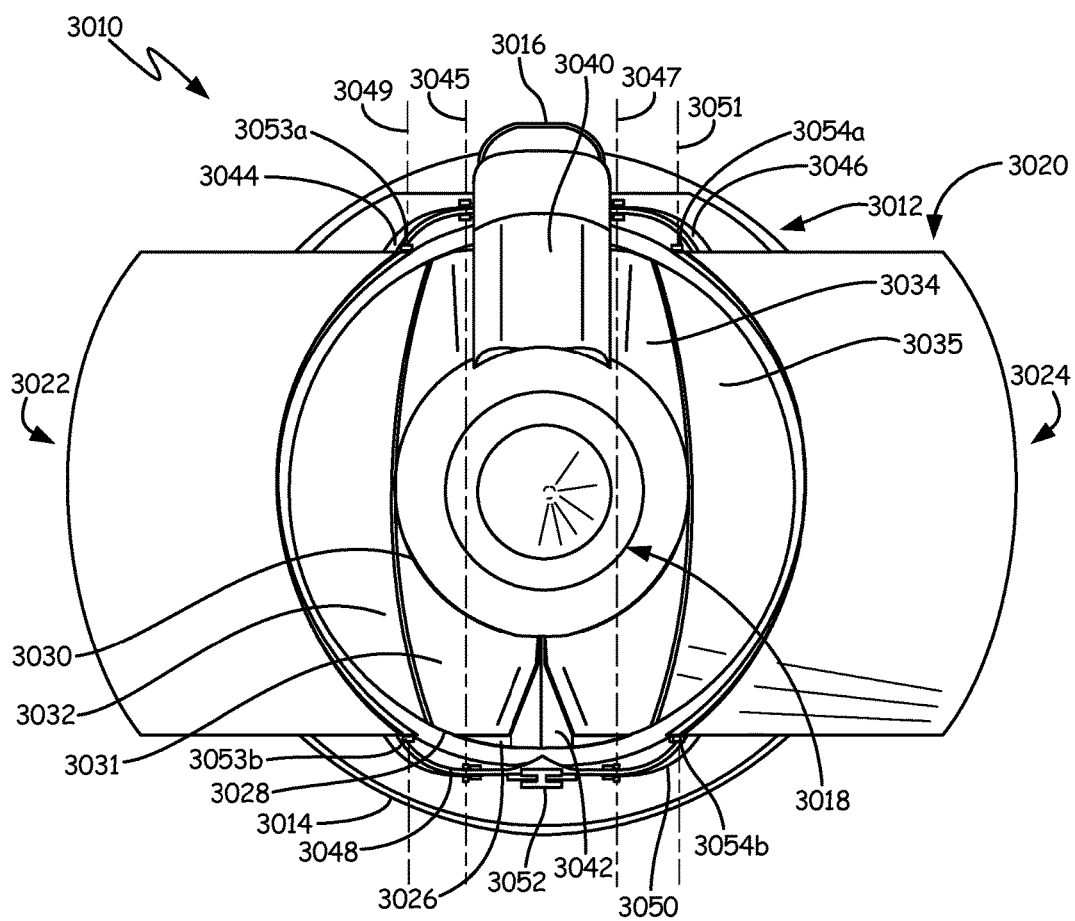
FIG. 17C is an aft elevation view of the gas turbine engine of FIGS. 17A and 17B with interior structures of the engine omitted.

Fan bypass stream $F_1$ is relatively cold air which enters through the fan at the front end of nacelle 3012 and passes through bypass duct 3026. When pivot thrust reverser 3020 is in the stowed position, fan bypass stream $F_1$ exits from an aft end of nacelle 3012 and can provide a majority of the propulsion generated by high bypass gas turbine engine 3018. However, when pivot thrust reverser 3020 is in the deployed position, as shown in FIGS. 17B and 17C, first tandem pivot door subassembly 3022 and second tandem pivot door subassembly 3024 open inside of nacelle 3012 and obstruct at least a portion of the flow of fan bypass stream $F_1$ through bypass duct 3026, such that a redirected fan bypass stream $F_4$ no longer exits from the aft end of nacelle 3012, but is instead diverted in another direction. Redirected fan bypass stream $F_4$ is redirected by deployed pivot thrust reverser 3020 to flow in the forward, or upstream, direction shown in FIGS. 17B and 17C. Importantly, pivot thrust reverser 3020 is configured such that there need not be any actuators, linkages, or other obstructions present in $F_{1'}$ flow path when pivot thrust reverser 3020 is in the deployed position, which could otherwise obstruct the flow of redirected fan bypass stream $F_4$ in the forward direction, thus reducing the effectiveness of pivot thrust reverser 3020. Redirecting fan bypass stream $F_{1'}$ as shown can restrict or prevent fan bypass stream $F_1$ from providing forward propulsion, but can also actively provide deceleration. Yet, nacelle ventilation stream $F_2$ and core stream $F_3$, which flow through the inside of engine 3018, can remain substantially unobstructed and continue to flow out downstream of engine 3018 when pivot thrust reverser 3020 is deployed in substantially the same manner as when pivot thrust reverser 3020 is in the stowed position.

In the illustrated embodiment, outer panel 3032 is larger than inner panel 3031 of first tandem pivot door subassembly 3022 and outer panel 3035 is larger than inner panel 3034 of second tandem pivot door subassembly 3024. However, inner panels 3031 and 3034 and outer panels 3032 and 3035 can be any combination of sizes, with the relevant configurations adjusted and opening 3019 sized accordingly. By using larger outer panels 3032 and 3035 as shown, outer panels 3032 and 3035 not only provide structural support to inner panels 3031 and 3034 respectively, but also take on functional roles. Larger outer panels 3032 and 3035 provide additional guidance, in addition to the guidance provided by inner panels 3031 and 3034, for redirecting fan bypass stream $F_4$ in the appropriate forward direction needed to provide deceleration. Consequently, by further guiding redirected fan bypass stream $F_{1'}$ in the forward direction, pivot thrust reverser 3020 operates more effectively. Furthermore, larger outer panels 3032 and 3035 also can function as an air break, and thus provide deceleration in addition to that provided by redirected fan bypass stream $F_4$.

Engine 3018 is centered inside nacelle 3012, in the illustrated embodiment, and thus is axially aligned with the engine fan at the front end of nacelle 3012 (axis C of FIG. 17A). Upper bi-fi fairing 3040 and lower bi-fi fairing 3042 serve to interconnect nacelle 3012 and engine 3018, as well as provide additional stiffness for nacelle 3012 and space for wires, tubes and other similar components.

In the illustrated embodiment, as best shown in FIG. 17C, linkage 3044 provides a hinged connection between inner panel 3031 (of first tandem pivot door subassembly 3022) and pivot axis 3045, with linkage 3044 fixed to nacelle 3012 at pivot axis 3045. In the same manner, linkage 3046 provides a hinged connection between inner panel 3034 (of second tandem pivot door subassembly 3024) and pivot axis 3047, with linkage 3046 fixed to nacelle 3012 at pivot axis 3047. Pivot axis 3045 of inner panel 3031 and pivot axis 3047 of inner panel 3034 can be positionally fixed relative to assembly 3010, nacelle 3012, and/or engine 3018. Pivot axis 3045 is spaced from inner panel 3031 and extends from linkage 3044 to linkage 3048. Similarly, pivot axis 3047 is spaced from inner panel 3034 and extends from linkage 3046 to linkage 3050. Linkage 3048 provides a connection between inner panel 3031 and actuator 3052, while linkage 3050 provides a connection between inner panel 3034 and actuator 3052.

Outer panel 3032 (of first tandem pivot door subassembly 3022) is fixed to nacelle 3012 at fixed pivot connection points 3053a and 3053b, and pivots about pivot axis 3049. Points 3053a and 3053b provide hinge points for outer panel 3032 and are located at or near a perimeter of outer panel 3032 in nacelle 3012, between outer surface 3014 of nacelle 3012 and outer surface 3028 of bypass duct 3026, on pivot axis 3049. Outer panel 3035 (of second tandem pivot door subassembly 3024) is fixed to nacelle 3012 at fixed pivot connection points 3054a and 3054b, and pivots about pivot axis 3051. Points 3054a and 3054b provide hinge points for outer panel 3035 and are located at or near a perimeter of outer panel 3035 in nacelle 3012, between outer surface 3014 of nacelle 3012 and outer surface 3028 of bypass duct 3026, on pivot axis 3051. Pivot axis 3049 of outer panel 3032 and pivot axis 3051 of outer panel 3035 can each be positionally fixed relative to assembly 3010, nacelle 3012, and/or engine 3018. Pivot axis 3049 extends from point 3053a to point 3053b. Pivot axis 3051 extends from point 3054a to point 3054b. As shown and discussed throughout, inner panels 3031 and 3034 can maintain connection with outer panels 3032 and 3035 by multi-bar linkages 3041 and 3043. As a result, inner panel 3031 and outer panel 3032 of first tandem pivot door subassembly 3022 can pivot simultaneously about different pivot axes 3045 and 3049 without translating relative to those axises 3045 and 3049. Similarly, inner panel 3034 and outer panel 3035 of second tandem pivot door subassembly 3024 can pivot simultaneously about different pivot axes 3047 and 3051 without translating.

Actuator 3052 pivots both first tandem pivot door subassembly 3022 and second tandem pivot door subassembly 3024 from the stowed position to the deployed position without translation of first tandem pivot door subassembly 3022, second tandem pivot door subassembly 3024, or any portion of nacelle 3012. In the deployed position shown in FIGS. 17B and 17C, first tandem pivot door subassembly 3022 and second tandem pivot door subassembly 3024 circumferentially surround inner surface 3030 of bypass duct 3026. Inner panel 3031 of first tandem pivot door subassembly 3022 and inner panel 3034 of second tandem pivot door subassembly 3024 are each configured to circumferentially surround inner surface 3030 of bypass duct 3026 such that an at least partially sealing, mating relationship is formed and there is relatively little leakage of fan bypass stream $F_1$ (the only leakage coming from portions where bypass duct 3026 is visible). This means that nearly all of fan bypass stream $F_1$ is redirected, resulting in a highly efficient pivot thrust reverser 3020. Yet, at the same time entire pivot thrust reverser 3020 can be deployed by a single actuator 3052, and therefore, provides a simplified design requiring minimal parts, and thus increases reliability and reduces maintenance costs.

Figure 18A:
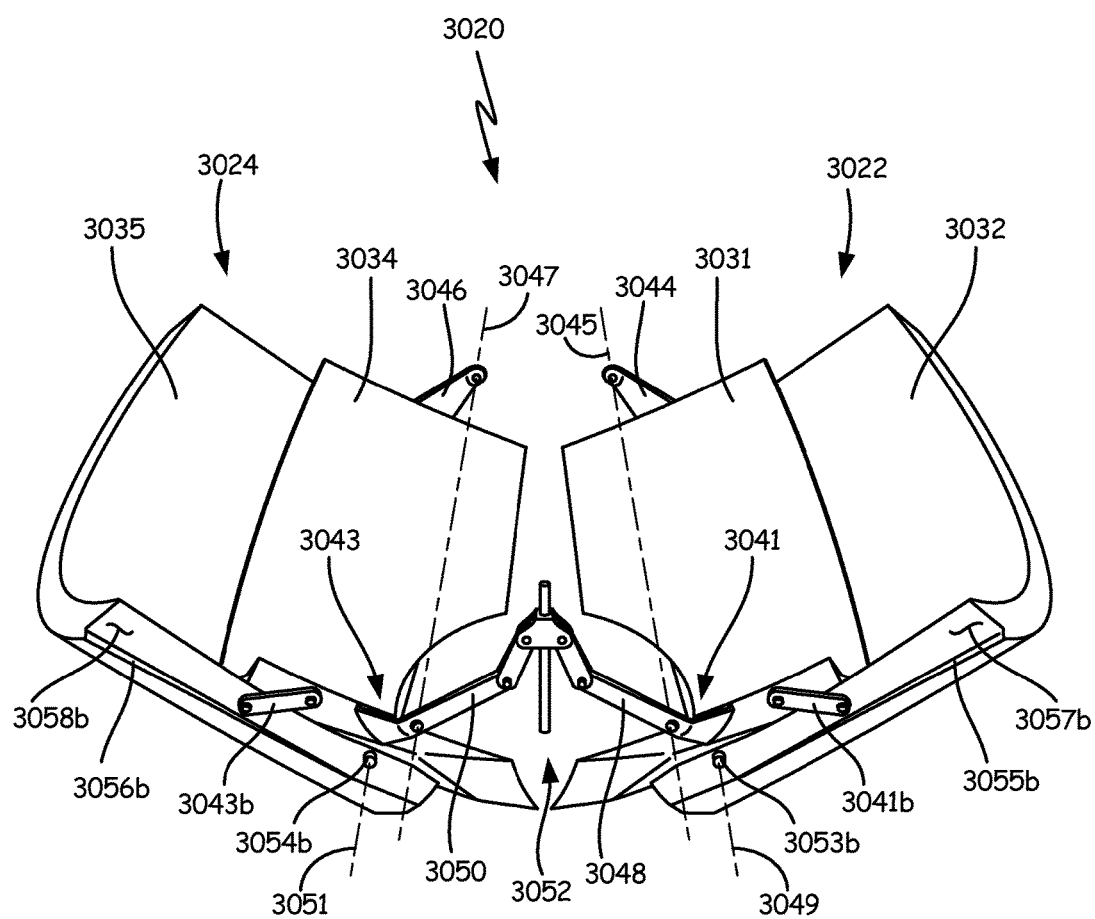
FIG. 18A is a perspective view of the pivot thrust reverser, with a single actuator, in the deployed position showing the inner panels connected to the outer panels by multi-bar linkages.
Figure 18B:
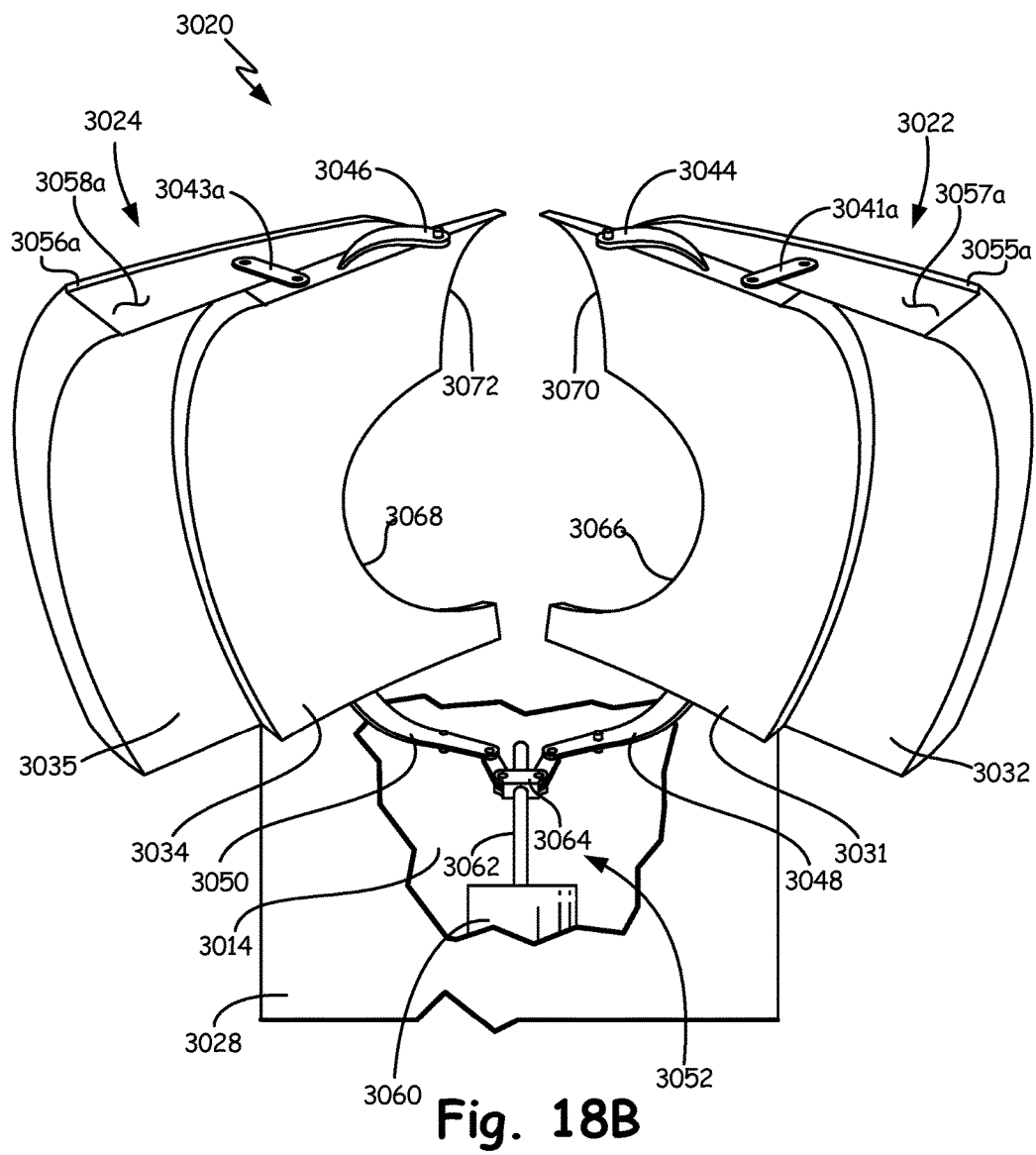
FIG. 18B is another perspective view of the pivot thrust reverser and single actuator of FIG. 18A.

FIGS. 18A and 18B show pivot thrust reverser 3020, with a single actuator 3052, in a deployed position. FIG. 18A shows a perspective view with a bottom of pivot thrust reverser 3020 visible. FIG. 18B shows a perspective view with a top of pivot thrust reverser 3020 visible. Certain assembly 3010 components are left out for simplicity. Included, in addition to that shown and described previously, are top link 3041a and bottom link 3041b of first tandem pivot door subassembly 3022, top link 3043a and bottom link 3043b of second tandem pivot door subassembly 3024, top overhang 3055a and bottom overhang 3055b of outer panel 3032 of first tandem pivot door subassembly 3022, top overhang 56a and bottom overhang 3056b of outer panel 3035 of second tandem pivot door subassembly 3024, multi-bar linkage 3041 of first tandem pivot door subassembly 3022, multi-bar linkage 3043 of second tandem pivot door subassembly 3024, surfaces 3057a and 3057b of outer panel 3032 of first tandem pivot door subassembly 3022, surfaces 3058a and 3058b of outer panel 3035 of second tandem pivot door subassembly 3024, motor 3060, threaded rod 3062, threaded knucklehead 3064, cutouts 3066 and 3068, and aft edges 3070 and 3072.

Multi-bar linkage 3041 can include link 3041a, link 3041b, and linkage 3048. Linkage 3048 provides a connection between inner panel 3031 and actuator 3052, while links 3041a and 3041b provide a connection between inner panel 3031 and outer panel 3032. Similarly, multi-bar linkage 3043 can include link 3043a, link 3043b, and linkage 3050. Linkage 3050 provides a connection between inner panel 3031 and actuator 3052, while links 3043a and 3043b provide a connection between inner panel 3034 and outer panel 3035. In other embodiments, multi-bar linkages 3041 and 3043 could include alternate and/or additional connections between actuator 3052, inner panels 3031 and 3034, and/or outer panels 3032 and 3035, respectively. Overhangs 3055a and 3055b of outer panel 3032 extend out over surfaces 3057a and 3057b, providing coverage of links 3041a and 3041b respectively when pivot thrust reverser 3020 is in the stowed position. Overhangs 3056a and 3056b of outer panel 3035 extend out over surfaces 3058a and 3058b, providing coverage of links 3043a and 3043b when pivot thrust reverser 3020 is in the stowed position. Thus, overhangs 3055a, 3055b, 3056a, and 3056b help alleviate aerodynamic concerns of nacelle 3012 when pivot thrust reverser 3020 is stowed.

Actuator 3052 is located between outer surface 3028 of bypass duct 3026 and outer surface 3014 of nacelle 3012 (see also FIG. 17C). Actuator 3052 can be, for example, a bolt screw linear actuator as shown here that includes motor 3060, threaded rod 3062, and threaded knucklehead 3064. However, various other types of actuators can also be used in alternate embodiments to pivot both first tandem pivot door subassembly 3022 and second tandem pivot door subassembly 3024 between the stowed and deployed positions. Motor 3060 moves threaded knucklehead 3064 down threaded rod 3062 towards motor 3060, and in so doing, pivots inner panel 3031 on pivot axis 3045. Then, due to the connection between inner panel 31 and outer panel 3032 by multi-bar linkage 3041, outer panel 3032 is simultaneously made to pivot on pivot axis 3049. At the same time, inner panel 3034 is also pivoted on pivot axis 3047, and due to the connection between inner panel 3034 and outer panel 3032 by multi-bar linkage 3043, outer panel 3035 is simultaneously made to pivot on pivot axis 3051. In this manner, first tandem pivot door subassembly 3022 and second tandem pivot door subassembly 3024 are pivoted by single actuator 3052 about different pivot axes between stowed and deployed positions without translating (relative to assembly 3010).

Additionally, inner panel 3031 of first tandem pivot door subassembly 3022 contains cutout 3066 in aft edge 3070 and inner panel 3034 of second tandem pivot door subassembly 3024 contains cutout 3068 in aft edge 3072. Both cutouts 3066 and 3068 are located on lower portions of aft edges 3070 and 3072 respectively. When in the deployed position, as shown here, aft edge 3070 of inner panel 3031 faces aft edge 3072 of inner panel 3034. As a result, cutout 3066 is aligned to face cutout 3068 when tandem pivot door subassemblies 3022 and 3024 are deployed, forming an opening in pivot thrust reverser 3020 to accommodate engine 3018. Both cutout 3066 and cutout 3068 can be arc-shaped, resulting in the opening in pivot thrust reverser 3020 being generally circular in shape. However, in alternative embodiments, cutouts 3066 and 3068 can have various different shapes and be placed at any location on inner panels 3031 and 3034. Also, when deployed, aft edges 3070 and 3072 of inner panels 3031 and 3034 extend longitudinally beyond aft edges of outer panels 3032 and 3035, such that aft edges 3070 and 3072 do not have outer panels 3032 and 3035 located directly behind them.

FIG. 19 is an exploded perspective view of inner panel 3031 and outer panel 3032 of first tandem pivot door subassembly 3022. Included, in addition to that shown and described previously, are inward-facing protrusion 3067 and side protrusion 3069 on outer panel 3032. Inner panel 3031 is placed on top of outer panel 3032, with links 3041a and 3041b then added to provide the connection between inner panel 3031 and outer panel 3032. When connected and stowed, aft edge 3070 of inner panel 3031 extends only up to where side protrusion 3069 begins, such that side protrusion 3069 at an aft edge of outer panel 3032 extends longitudinally beyond aft edge 3070. In this embodiment, inward-facing protrusion 3067 is of a shape complimentary with cutout 3066 in aft edge 3070 of inner panel 3031, such that inward-facing protrusion 3067 protrudes into the location of cutout 3066 when inner panel 3031 is placed on top of outer panel 3032. Also, side protrusion 3069 is of a shape complimentary with curved aft edge 3070 of inner panel 3031, such that side protrusion 3069 protrudes up from an interface of aft edge 3070 and side protrusion 3069. Protrusions 3067 and 3069 then allow first tandem pivot door subassembly 3022 to both provide a substantially smooth outer surface 3028 of bypass duct 3026 (see FIG. 17C) and a complete outer surface 3014 of nacelle 3012 when first tandem pivot door subassembly 22 is stowed (see FIG. 17A). Consequently, fan bypass stream $F_1$ experiences relatively little turbulence when passing through bypass duct 3026 at the location where outer surface 3028 of bypass duct 3026 is formed by stowed first tandem pivot door subassembly 3022. This allows assembly 3010 to produce efficient and effective propulsion even with pivot thrust reverser 3020 included in assembly 3010.

Figure 20A:
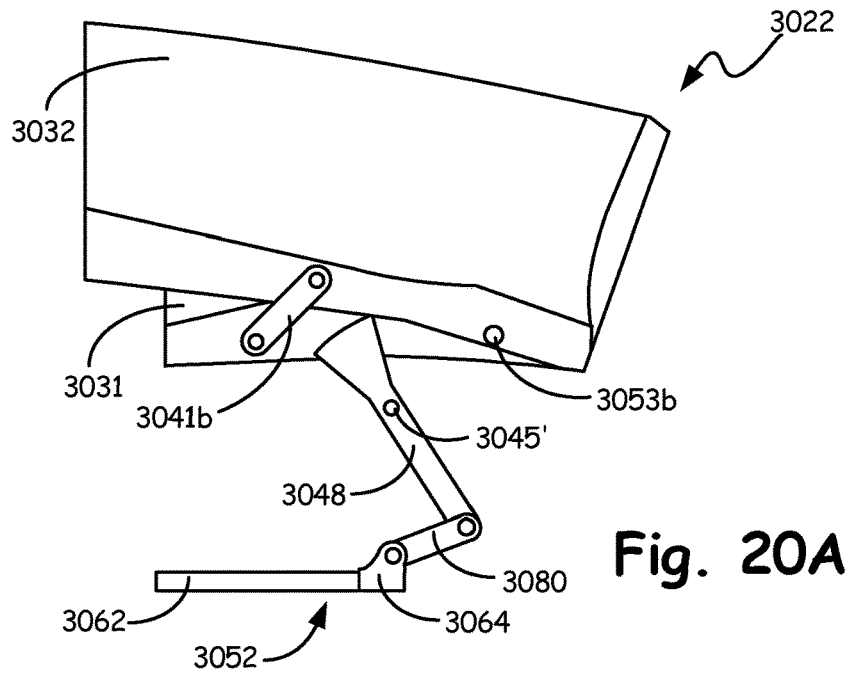
FIG. 20A is a plan view of the tandem pivot door subassembly, shown in isolation, in the stowed position.
Figure 20B:
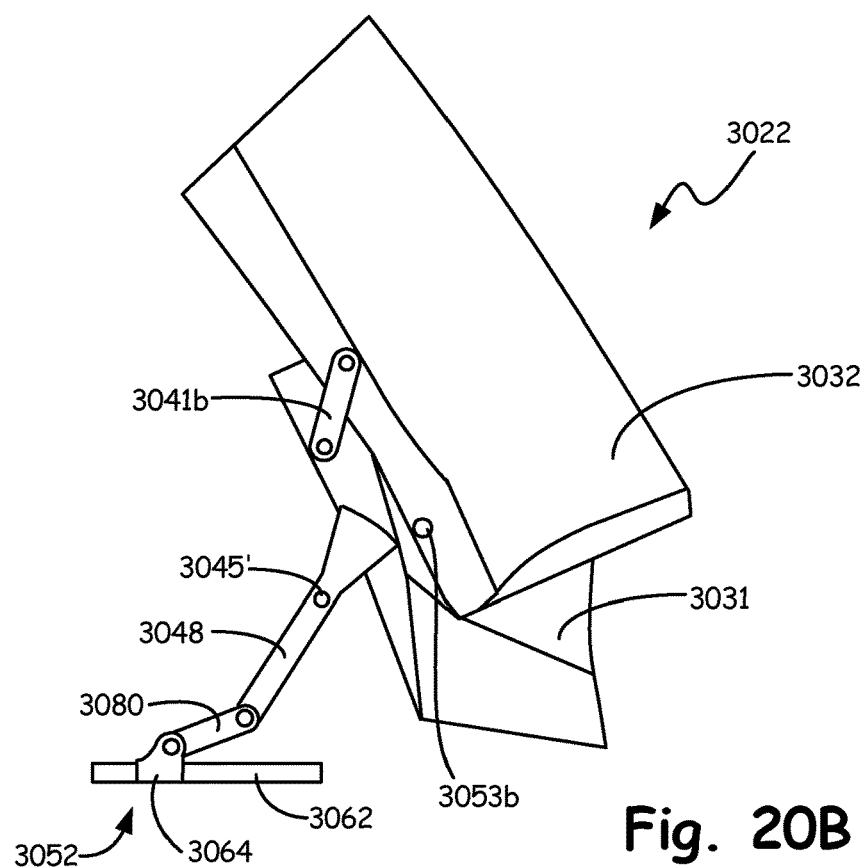
FIG. 20B is a plan view of the tandem pivot door subassembly, shown in isolation, in the deployed position.

FIGS. 20A and 20B show a plan view of actuator 3052 and first tandem pivot door subassembly 3022 in isolation, with first tandem pivot door subassembly 3022 pivoted from the stowed to the deployed position. FIG. 20A shows first tandem pivot door subassembly 3022 in the stowed position. FIG. 20B shows first tandem pivot door subassembly 3022 pivoted to the deployed position. Included, in addition to that shown and described previously, are fixed pivot point 3045' and link 3080. Fixed pivot point 3045' is located on pivot axis 3045 (shown in FIG. 17C) and is a pivot connection point about which inner panel 3031 rotates. Point 3053b, as discussed with respect to FIG. 17C, is located on pivot axis 3049, and is a pivot connection point about which outer panel 3032 is hinged to nacelle 3012 and pivotally rotates. In this embodiment, point 3053b is located at or near a perimeter of outer panel 3032, and more specifically is at or near an aft end of outer panel 3032 which can pivot inside of nacelle 3012. Link 3080 provides a connection between threaded knucklehead 3064 of actuator 3052 and linkage 3048.

As first tandem pivot door subassembly 3022 is pivoted to the deployed position, threaded knucklehead 3064 moves down threaded rod 3062. This forces inner panel 3031 to pivot about pivot axis 3045 on point 3045', and in turn, due to the connection between inner panel 3031 and outer panel 3032 by links 3041a (shown in FIG. 18B) and 3041b, forces outer panel 3032 to pivot about pivot axis 3049 on point 3053b. Thus, pivoting of inner panel 3031 results also in pivoting of outer panel 3032. Outer panel 32 is held in the position shown in FIG. 20B due to point 3053b being fixed to nacelle 3012. Therefore, first tandem pivot door subassembly 3022 is deployed by pivoting inner panel 3031 and outer panel 3032 simultaneously about different pivot points. This allows first tandem pivot door subassembly 3022 to deploy and avoid interference from nacelle 3012 that otherwise would occur due to the location of first tandem pivot door subassembly 3022.

The present embodiments provide a highly effective thrust reverser for use in a gas turbine engine. This is because configuring inner panels 3031 and 34 with cutouts 3066 and 3068 to surround inner surface 3030 of bypass duct 3026 as shown allows nearly all of fan bypass stream $F_1$ to be redirected in the appropriate direction, while at the same time minimizing the number of components needed to pivot both first and second tandem pivot door subassemblies 3022 and 3024 from the stowed to the deployed position without interference from nacelle 3012. This is turn decreases the weight of thrust reverser 3020 while increasing the reliability of thrust reverser 3020. Additionally, the design of thrust reverser 3020 provides a modular assembly which allows for direct mounting of thrust reverser 3020 in position.

Discussion of Possible Embodiments

The following are non-exclusive descriptions of possible embodiments of the present invention.

A gas turbine engine includes a first annular portion that is stationary and adapted for partially surrounding an engine core. The first annular portion includes a fore pylon connecting portion. The gas turbine engine also includes a rail coupled to the fore pylon and extending in the aft direction from the first annular portion. The gas turbine engine also includes a second annular portion, arranged aft of the first portion and coupled to the rail. The second annular portion is movable along an engine core centerline between a closed position and at least one open position. The second annular portion is configured to engage the first annular portion in the closed position, thereby providing access to the engine core. The gas turbine engine further comprises a thrust reverser arranged in the second annular portion.

The gas turbine engine of the preceding paragraph can optionally include, additionally and/or alternatively, any one or more of the following features, configurations and/or additional components:

The slidable portion may be configured to allow access to the external core features when the slidable portion is arranged in a partial open position.

The slidable portion may be configured to allow access to the core when the slidable portion is arranged in a fully open position.

The thrust reverser may be a pivot thrust reverser having a first pivot door and a second pivot door. The first pivot door may form a first portion of an outer nacelle when stowed. The second pivot door may be spaced from the first pivot door and form a second portion of the outer surface of the nacelle when stowed. The pivot doors may each form a portion of a surface of a bypass duct when stowed. When deployed, the first and second pivot doors may circumferentially surround a portion of an inner surface of a bypass duct such that when the pivot thrust reverser is deployed during engine operation, a fan bypass stream is redirected while both a core stream and a nacelle ventilation stream flow in substantially the same manner as when the pivot thrust reverser is stowed.

The pivot thrust reverser may further include an actuator configured to pivot both the first pivot door and the second pivot door from the stowed position to the deployed position. The actuator may be located between the surface of the bypass duct and the outer surface of the nacelle.

The actuator may pivot both the first and second pivot doors from the stowed position to the deployed position on respective pivot axes that are each positionally fixed relative to the gas turbine engine assembly.

The thrust reverser may be a pivot thrust reverser comprising a first pivot door with an aft edge, a second pivot door with an aft edge such that when the first pivot door and the second pivot door are in a deployed position the aft edge of the first pivot door and the aft edge of the second pivot door face each other, a first cutout on the first pivot door, and a linkage of the first pivot door and a linkage of the second pivot door are each connected to an actuator which pivots the first pivot door and the second pivot door on pivot axes that are positionally fixed.

The thrust reverser may be a pivot thrust reverser including a first tandem pivot door subassembly comprising an inner panel and an outer panel, wherein the inner panel and the outer panel are connected by a first sliding rail, and a second tandem pivot door subassembly comprising an inner panel and an outer panel, wherein the inner panel and the outer panel are connected by a second sliding rail.

The inner panel and the outer panel of the first tandem pivot door subassembly may be configured to rotate simultaneously about different pivot axes, and the inner panel and the outer panel of the second tandem pivot door subassembly may be configured to rotate simultaneously about different pivot axes.

The gas turbine engine may also include an actuator that is configured to pivot both the first tandem pivot door subassembly and the second tandem pivot door subassembly from a stowed position to a deployed position on respective pivot axes that are each positionally fixed relative to a mounting location.

The pivot point of the inner panel of the first tandem pivot door subassembly may be located on a linkage operatively connected between an actuator and the inner panel of the first tandem pivot door subassembly, and the pivot point of the outer panel of the first tandem pivot door subassembly may be located at or near a perimeter of the outer panel of the first tandem pivot door subassembly.

The thrust reverser may be a pivot thrust reverser having a first tandem pivot door subassembly comprising an inner panel and an outer panel. The inner panel and the outer panel may be connected so as to rotate simultaneously about respective pivot axes that are each positionally fixed axes relative to the gas turbine engine assembly. The thrust reverser may also have a second tandem pivot door subassembly spaced from the first tandem pivot door subassembly and comprising an inner panel and an outer panel. The inner panel and the outer panel may be connected so as to rotate simultaneously about respective pivot axes that are each positionally fixed axes relative to the gas turbine engine assembly.

The gas turbine engine may also include an actuator configured to pivot both the first tandem pivot door subassembly and the second tandem pivot door subassembly from a stowed position to a deployed position. The actuator may be located between a surface of a bypass duct and an outer surface of a nacelle.

In a deployed position, the first tandem pivot door subassembly and the second tandem pivot door subassembly may circumferentially surround an inner surface of a bypass duct such that when the pivot thrust reverser is deployed during engine operation a fan bypass stream is redirected while both a core stream and a nacelle ventilation stream flow in the same manner as when the pivot thrust reverser is stowed.

The thrust reverser may be a pivot thrust reverser having a first tandem pivot door subassembly comprising an inner panel with an aft edge, an outer panel with an aft edge, and a connection between the inner panel and the outer panel. The thrust reverser may also include a second tandem pivot door subassembly comprising an inner panel with an aft edge, an outer panel with an aft edge, and a connection between the inner panel and the outer panel. The first tandem pivot door subassembly and the second tandem pivot door subassembly may be in a deployed position the aft edge of the first tandem pivot door subassembly inner panel faces the aft edge aft edge of the second tandem pivot door subassembly inner panel and the aft edge of the first tandem pivot door subassembly outer panel faces the aft edge of the second tandem pivot door subassembly outer panel. The thrust reverser may also include a first cutout on the first tandem pivot door subassembly inner panel, and a second cutout on the second tandem pivot door subassembly inner panel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
    an engine core;
    a fan;
    a nacelle extending along an engine core centerline; and
    a thrust reverser arranged in the nacelle, wherein the thrust reverser is a pivot thrust reverser comprising:
        a first tandem pivot door subassembly;
        a second tandem pivot door subassembly;
        an actuator connected to the nacelle, the actuator being oriented parallel to the engine core centerline;
        a first linkage of the first tandem pivot door subassembly; and
        a second linkage of the second tandem pivot door subassembly;
        wherein each of the first linkage and the second linkage are connected to the actuator, the actuator configured to pivot the first tandem pivot door subassembly and the second tandem pivot door subassembly via the first linkage and the second linkage, respectively;
        wherein the first tandem pivot door subassembly comprises:
            a first inner panel; and
            a first outer panel;
            wherein the first inner panel pivots on a first inner axis that is positionally fixed with respect to an aft edge of the nacelle, and the first outer panel pivots on a first outer axis that is positionally fixed with respect to the aft edge of the nacelle; and
            wherein the first inner panel and the first outer panel are connected by a first door linkage that is positioned fore of the first inner axis when the first tandem pivot door subassembly is stowed;
        wherein the second tandem pivot door subassembly comprises:
            a second inner panel; and a second outer panel;
  wherein the second inner panel pivots on a second inner axis that is positionally fixed with respect to the aft edge of the nacelle, and the second outer panel pivots on a second outer axis that is positionally fixed with respect to the aft edge of the nacelle; and
  wherein the second inner panel and the second outer panel are connected by a second door linkage that is positioned fore of the second inner axis when the second tandem pivot door subassembly is stowed;
  wherein each of the first tandem pivot door subassembly and the second tandem pivot door subassembly respectively surround substantially half of the engine core when deployed; and
  wherein, when deployed during operation of the gas turbine engine, the first and second tandem pivot door subassemblies are configured to redirect a fan bypass stream generated by the fan while permitting both a core stream generated by the engine core and a nacelle ventilation stream to flow in a similar manner as when the first and second tandem pivot door subassemblies are stowed during operation of the gas turbine engine.

2. The gas turbine engine of claim 1, further comprising:
a fore pylon;
a first annular portion of the nacelle that is stationary and adapted for partially surrounding the engine core, the first annular portion including a fore pylon connecting portion;
a rail coupled to the fore pylon and extending aft from the first annular portion; and
a second annular portion of the nacelle, aft of the first portion and coupled to the rail, the second annular portion being movable along the engine core centerline between a closed position and at least one open position, wherein the second annular portion is configured to engage the first annular portion in the closed position, thereby preventing access to the engine core.

3. The gas turbine engine of claim 2, wherein the second annular portion is configured to allow access to a plurality of external core features when the second annular portion is arranged in a partially open position, and wherein the second annular portion is configured to allow access to the engine core when the second annular portion is arranged in a fully open position.

4. The gas turbine engine of claim 1, wherein:
the first tandem pivot door subassembly forms a first portion of an outer surface of the nacelle when stowed; and
the second tandem pivot door subassembly is spaced from the first tandem pivot door subassembly and forms a second portion of the outer surface of the nacelle when stowed, wherein the first and second tandem pivot door subassemblies each form a portion of a surface of a bypass duct when stowed.

5. The gas turbine engine of claim 4, wherein the actuator is configured to pivot both the first and second tandem pivot door subassemblies from a stowed position to a deployed position, wherein the actuator is located between the surface of the bypass duct and the outer surface of the nacelle.

6. The gas turbine engine of claim 1, further comprising:
a threaded knucklehead that connects the actuator to both the first linkage and the second linkage.

7. The turbine engine of claim 1, wherein:
the first inner panel has a first aft edge;
the second inner panel has a second aft edge;
when the first inner panel and the second inner panel are in a deployed position, the first and second aft edges face each other;
the first inner panel has a first cutout; and
the second inner panel has a second cutout.

8. The gas turbine engine of claim 1, wherein each of the first linkage and the second linkage respectively comprise two connected links.

9. The gas turbine engine of claim 1, wherein the first inner panel and the first outer panel of the first tandem pivot door subassembly are configured to rotate simultaneously about the first inner axis and the first outer axis, respectively, and wherein the second inner panel and the second outer panel of the second tandem pivot door subassembly are configured to rotate simultaneously about the second inner axis and the second outer axis, respectively.

10. The gas turbine engine of claim 9, wherein the actuator is configured to pivot both the first tandem pivot door subassembly and the second tandem pivot door subassembly from a stowed position to a deployed position, and wherein the actuator is located between a surface of a bypass duct and an outer surface of the nacelle.

11. The gas turbine engine of claim 1, wherein the first outer axis is located at or near a perimeter of the first outer panel of the first tandem pivot door subassembly.

12. The gas turbine engine of claim 1, wherein the first door linkage is positioned fore of the first outer axis and the second door linkage is positioned fore of the second outer axis.

13. A gas turbine engine comprising:
an engine core;
a fan;
a nacelle extending along an engine core centerline; and
a thrust reverser arranged in the nacelle, wherein the thrust reverser is a pivot thrust reverser comprising:
  a first tandem pivot door subassembly;
  a second tandem pivot door subassembly;
  an actuator connected to the nacelle, the actuator being oriented parallel to the engine core centerline;
  a first linkage of the first tandem pivot door subassembly; and
  a second linkage of the second tandem pivot door subassembly;
  wherein each of the first linkage and the second linkage are connected to the actuator, the actuator configured to pivot the first tandem pivot door subassembly and the second tandem pivot door subassembly via the first linkage and the second linkage, respectively;
  wherein the first tandem pivot door subassembly comprises:
    a first inner panel; and
    a first outer panel;
    wherein the first inner panel pivots on a first inner axis that is positionally fixed with respect to an aft edge of the nacelle, and the first outer panel pivots on a first outer axis that is positionally fixed with respect to the aft edge of the nacelle; and
    wherein the first inner panel and the first outer panel are connected by a first door linkage that is positioned fore of the first outer axis:
  wherein the second tandem picot door subassembly comprises:
    a second inner panel; and
    a second outer panel;
    wherein the second inner panel pivots on a second inner axis that is positionally fixed with respect to the aft edge of the nacelle, and the second outer panel pivots on a second outer axis that is positionally fixed with respect to the aft edge of the nacelle; and wherein the second inner panel and the second outer panel are connected by a second door linkage that is positioned fore of the second outer axis; and wherein each of the first tandem pivot door subassembly and the second tandem pivot door subassembly respectively surround substantially half of the engine core when deployed; and wherein, when deployed during operation of the gas turbine engine, the first and second tandem pivot door subassemblies are configured to redirect a fan bypass stream generated by the fan while permitting both a core stream generated by the engine core and a nacelle ventilation stream to flow in a similar manner as when the first and second tandem pivot door subassemblies are stowed during operation of the gas turbine engine.

14. The gas turbine engine of claim 13, further comprising:
a fore pylon;
a first annular portion of the nacelle that is stationary and adapted for partially surrounding the engine core, the first annular portion including a fore pylon connecting portion;
a rail coupled to the fore pylon and extending aft from the first annular portion; and
a second annular portion of the nacelle, aft of the first portion and coupled to the rail, the second annular portion being movable along the engine core centerline between a closed position and at least one open position, wherein the second annular portion is configured to engage the first annular portion in the closed position, thereby preventing access to the engine core.

15. The gas turbine engine of claim 14, wherein the second annular portion is configured to allow access to a plurality of external core features when the second annular portion is arranged in a partially open position, and wherein the second annular portion is configured to allow access to the engine core when the second annular portion is arranged in a fully open position.

16. The gas turbine engine of claim 13, wherein:
the first tandem pivot door subassembly forms a first portion of an outer surface of the nacelle when stowed; and
the second tandem pivot door subassembly is spaced from the first tandem pivot door Subassembly and forms a second portion of the outer surface of the nacelle when stowed, wherein the first and second tandem pivot door subassemblies each form a portion of a surface of a bypass duct when stowed.

17. The gas turbine engine of claim 16, wherein the actuator is configured to pivot both the first and second tandem pivot door subassemblies from a stowed position to a deployed position, wherein the actuator is located between the surface of the bypass duct and the outer surface of the nacelle.

18. The gas turbine engine of claim 13, further comprising:
a threaded knucklehead that connects the actuator to both the first linkage and the second linkage.

19. The gas turbine engine of claim 1, wherein each of the first linkage and the second linkage respectively comprise two connected links.

* * * * *

UNITED STATES PATENT AND TRADEMARK OFFICE
CERTIFICATE OF CORRECTION

Page 1 of 1

PATENT NO. : 10,180,117 B2
APPLICATION NO. : 15/230086
DATED : January 15, 2019
INVENTOR(S) : Gabriel L. Suciu, Jesse M. Chandler and T. David Bomzer It is certified that error appears in the above-identified patent and that said Letters Patent is hereby corrected as shown below:

In the Specification

Delete "pylori"
Insert --pylon--

In the following columns and lines:

Column 4, Line 64
Column 9, Line 17
Column 9, Line 34
Column 9, Line 36
Column 9, Line 38
Column 9, Line 43
Column 9, Line 44
Column 9, Line 47
Column 9, Line 61
Column 10, Line 1
Column 10, Line 4
Column 10, Line 8
Column 11, Line 53
Column 12, Line 6
Column 20, Line 41
Column 20, Line 67

Signed and Sealed this
Twenty-sixth Day of March, 2019

Andrei Iancu
*Director of the United States Patent and Trademark Office*